United States Patent
Gilbert et al.

(10) Patent No.: US 10,058,032 B2
(45) Date of Patent: Aug. 28, 2018

(54) MOWING MACHINE BRAKE APPARATUS WITH SLIDEABLE ENGAGEMENT

(71) Applicant: Parker-Hannifin Corporation, Cleveland, OH (US)

(72) Inventors: Kenneth Todd Gilbert, Bristol, TN (US); David M. Heathcoat, Jr., Greenville, TN (US); Jason S. Richardson, Chuckey, TN (US); Taylor Johnson, Johnson City, TN (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 0 days.

(21) Appl. No.: 15/224,966

(22) Filed: Aug. 1, 2016

(65) Prior Publication Data

US 2017/0027106 A1    Feb. 2, 2017

Related U.S. Application Data

(60) Provisional application No. 62/199,541, filed on Jul. 31, 2015, provisional application No. 62/264,585, filed on Dec. 8, 2015.

(51) Int. Cl.
*F16D 63/00* (2006.01)
*A01D 69/10* (2006.01)

(52) U.S. Cl.
CPC ........... *A01D 69/10* (2013.01); *F16D 63/006* (2013.01)

(58) Field of Classification Search
CPC ...... F16D 31/02; F16D 65/14; F16D 2125/22; F16D 2125/32; F16D 63/006; B60K 7/0015; B60K 2007/0046; A01D 34/64; A01D 69/10
See application file for complete search history.

(56) References Cited

U.S. PATENT DOCUMENTS

| | | | |
|---|---|---|---|
| 1,788,317 A | 1/1931 | Morier et al. |
| 3,032,146 A | 5/1962 | Szabo et al. |
| 3,361,231 A | 1/1968 | Carroll |
| 3,485,329 A | 12/1969 | Hauser |
| 3,856,119 A | 12/1974 | Harrington |

(Continued)

FOREIGN PATENT DOCUMENTS

GB    1317801    5/1973

*Primary Examiner* — Melody M Burch
(74) *Attorney, Agent, or Firm* — Renner, Otto, Boisselle & Sklar, LLP

(57) ABSTRACT

A brake apparatus for a mowing machine that includes a brake gear operatively rotatable with a rotatable member and a lock assembly for meshing with the brake gear to restrict rotation of the brake gear. A guide rail assembly is fixable relative to a support for supporting the rotatable member for rotation. The guide rail assembly guides a lock assembly movable between an unlocked arrangement and a locked arrangement. An actuator plate and the guide rail assembly jointly engage the lock assembly to effect meshing and unmeshing of at least one engagement member of the lock assembly, such as a roller or a jaw member, with the brake gear. The actuator plate is selectively rotatable about an axis of rotation of the brake gear relative to the guide rail assembly, where rotation of the actuator plate effects movement of the lock assembly between the unlocked and locked arrangements.

19 Claims, 18 Drawing Sheets

(56) References Cited

U.S. PATENT DOCUMENTS

| | | | |
|---|---|---|---|
| 4,161,240 A | | 7/1979 | Pringle |
| 4,294,338 A | | 10/1981 | Simmons |
| 4,369,867 A | | 1/1983 | Lemieux |
| 4,376,614 A | | 3/1983 | Woodruff |
| 4,705,148 A | * | 11/1987 | Zindler ............... E04F 10/0614 160/298 |
| 5,526,909 A | | 6/1996 | Ohkawa |
| 5,740,891 A | | 4/1998 | Song |
| 6,983,829 B2 | | 1/2006 | Drennen et al. |
| 7,347,293 B1 | | 3/2008 | Hidaka |
| 7,762,116 B2 | | 7/2010 | McVey et al. |
| 7,931,129 B2 | | 4/2011 | Norman et al. |
| 9,260,006 B2 | | 2/2016 | Crosby et al. |
| 2005/0016304 A1 | | 1/2005 | Ishii et al. |
| 2008/0034958 A1 | | 2/2008 | Korthals |
| 2008/0120974 A1 | | 5/2008 | Dong et al. |
| 2012/0019050 A1 | | 1/2012 | Feusse |
| 2012/0241263 A1 | | 9/2012 | Stover et al. |
| 2014/0102066 A1 | | 4/2014 | Crosby et al. |
| 2014/0262630 A1 | | 9/2014 | Borshov et al. |

* cited by examiner

MOWING MACHINE BRAKE APPARATUS WITH SLIDEABLE ENGAGEMENT

FIELD OF INVENTION

The present invention relates generally to transmissions, and more particularly to brake assemblies, also herein referred to as brake apparatuses, for transmissions used in vehicles, such as mowing machines.

BACKGROUND

Hydrostatic transmissions have many uses, including the propelling of vehicles, such as mowing machines. A typical hydrostatic transmission system includes a variable displacement hydraulic pump connected in a closed hydraulic circuit with a fixed or variable displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral.

For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is often connected through suitable gearing to the vehicle's wheels or tracks. In some vehicles, such as zero-turn-radius mowers, separate hydraulic pumps and motors are used to independently drive separate wheels of an axle.

To park the vehicle, a brake apparatus is typically provided in the transmission to restrict or prevent rotational motion of a rotatable member, such as the output shaft, connected to the wheels. In some brake assemblies, a hub or rotor is connected to the rotatable member and a friction member engages the hub to restrict motion through frictional brake torque. In some brake assemblies, a locking mechanism mechanically interferes with the hub to restrict or prevent movement and provide the required brake torque.

Known brake assemblies typically require a gear reduction to amplify the brake torque, or may require larger than desired actuation forces to engage the hub. This is particularly problematic when the vehicle is parked on an incline or grade. Furthermore, such brake assemblies may require an external force, for example a hydraulic caliper or spring, to maintain load-holding and may also require the user to exert relatively high forces to disengage the brake, especially when parked at an incline.

SUMMARY OF INVENTION

The present invention provides a brake apparatus that affords one or more advantages over conventional vehicles, such as mowing machines. The brake apparatus restricts rotation of a rotatable member of a vehicle, such as an output shaft of a mowing machine. The brake apparatus includes a mechanism that does not require a gear reduction and may greatly lessen forces necessary to engage and disengage the brake apparatus via a brake construction that may encounter reduced friction forces during brake engagement and disengagement. Brake actuation forces (for engagement and disengagement) may be low, allowing for electrical actuation in place of manual actuation, such as via a pull lever, as is typically the case in small vehicles, such as zero-turn-radius mowers.

A brake apparatus according to the invention includes a brake gear fixable on the rotatable member and the brake gear being rotatable with the rotatable member about an axis of rotation of the brake gear. The brake apparatus also includes at least one engagement member for meshing with the brake gear to restrict rotation of the brake gear and a guide rail assembly configured to guide the engagement member between an unlocked position spaced from the brake gear and a locked position engaging the brake gear. An actuator plate is selectively rotatable about the axis of rotation of the brake gear, and a cam follower is movable by the actuator plate to effect movement of the engagement member. Rotation of the actuator plate moves the cam follower in a first direction relative to the axis of rotation to effect engagement of the engagement member with the brake gear and in a second direction opposite the first direction to enable disengagement of the engagement member from the brake gear.

In a first aspect of the invention, the lock assembly includes rollers for meshing with the brake gear, and which provide for reduced surface contact and consequently reduced frictional forces during brake actuation. This construction may improve operation for the user, particularly when the vehicle is parked on a grade. In a second aspect of the invention, the lock assembly includes at least one jaw member for meshing with the brake gear to restrict rotation of the brake gear.

According to the first aspect of the invention, a brake apparatus for restricting rotation of a rotatable member includes a brake gear for operatively rotating with the rotatable member about an axis of rotation of the brake gear, a lock roller for meshing with the brake gear to restrict rotation of the brake gear, and a cam roller movable to effect movement of the lock roller. A guide rail assembly is configured to guide the lock roller between an unlocked position spaced from the brake gear and a locked position engaging the brake gear. The brake apparatus also includes an actuator plate selectively rotatable about the axis of rotation of the brake gear, where the actuator plate and the guide rail assembly jointly engage the cam roller to move the cam roller in a first direction relative to the axis of rotation to effect engagement of the lock roller with the brake gear and in a second direction opposite the first direction to enable disengagement of the lock roller from the brake gear.

The actuator plate may be rotatably coupled to the guide rail assembly.

The guide rail assembly may include a guide slot, the cam roller and the lock roller being cooperatively slideable in the guide slot.

The guide slot may include a radially inward portion having an inclined surface along which inward movement of the lock roller is effected via the cam roller.

The brake gear may have a plurality of radially outwardly protruding gear teeth circumferentially spaced around the axis of rotation of the brake gear, where the lock roller is shaped to engage a root between adjacent crests of the gear teeth.

The brake apparatus may be provided in combination with a transmission having the rotatable member.

The guide rail assembly may include a guide slot that guides the cam roller radially inwardly and outwardly relative to the axis of rotation along a translation axis of the guide slot, where the translation axis is set orthogonal to the axis of rotation.

The actuator plate may include a cam slot through which the cam roller of the locking assembly is slidably coupled.

The cam slot may have a locking portion that engages the cam roller when the cam roller is moved fully inwardly towards the axis of rotation, the locking portion of the cam slot extending longitudinally along a plane of the actuator plate along a locking axis set orthogonal to the translation axis when the cam roller is moved fully inwardly towards the axis of rotation, thereby restricting unintentional rotation of the actuator plate.

The cam roller may be movable to effect movement of the lock roller via direct engagement with the lock roller, and the lock roller and cam roller may have rounded surfaces for engaging one another such that the engagement is a line-to-line engagement.

The brake apparatus may further include an intermediary roller disposed between the lock roller and the cam roller, where the cam roller is movable to effect movement of the lock roller via direct engagement with the intermediary roller.

The guide rail assembly may include a guide slot that retains each of the cam roller, lock roller, and intermediary roller to guide interengagement of the cam roller, lock roller, and intermediary roller.

The lock roller, intermediary roller and cam roller may each have rounded surfaces for engaging one another such that the engagement between adjacent rollers is a line-to-line engagement.

Also according to the first aspect of the invention, another brake apparatus for restricting rotation of a rotatable member includes a brake gear for operatively coupling with the rotatable member, and a lock roller for meshing with the brake gear to restrict rotation of the brake gear. Further included is a guide rail assembly having a guide slot retaining the lock roller, the lock roller slideable within the guide slot between a first position engaging the brake gear and a second position displaced from the brake gear. Also included is a cam roller for effecting movement of the lock roller to the first position, where the cam roller is slideable within the guide slot. An actuator plate is selectively controlled to rotate about the brake gear and is rotatably coupled to the guide rail assembly, where the cam roller is coupled within a plate slot of the actuator plate, and where rotation of the actuator plate moves the cam roller in the guide slot.

The cam roller may be movable within the guide slot to effect movement of the lock roller via direct engagement with the lock roller.

The brake apparatus may further include an intermediary roller disposed between the lock roller and the cam roller, where the cam roller is movable within the guide slot to effect movement of the lock roller via direct engagement with the intermediary roller.

Further according to the first aspect of the invention, yet another brake apparatus for restricting rotation of a rotatable member includes a brake gear for operatively coupling with the rotatable member and a lock roller for meshing with the brake gear to restrict rotation of the brake gear. Further included is a guide rail assembly having a guide slot retaining the lock roller, the lock roller slideable within the guide slot between a first position engaging the brake gear and a second position displaced from the brake gear. Also included is a cam roller effecting movement of the lock roller to the first position, the cam roller disposed radially outwardly of the lock roller in the guide slot. An actuator plate is selectively rotatable about the brake gear, wherein the cam roller is coupled within a plate slot of the actuator plate, and wherein rotation of the actuator plate moves the cam roller with the actuator plate to effect movement of the cam roller within the guide slot. Movement of the cam roller in a first direction relative to the brake gear effects the lock roller being moved up a radially inwardly disposed inclined portion of the guide slot into the first position engaging the brake gear, and movement of the cam roller in a second direction opposite the first direction enables the lock roller to move down the inclined portion and away from the brake gear into the second position displaced from the brake gear.

The diameter of the cam roller in the guide slot may be greater than the diameter of the lock roller in the guide slot.

The plate slot may be a cam slot extending linearly along the actuator plate, where rotation of the actuator plate cams the cam roller in the cam slot, and where movement of the cam roller within the guide slot is effected as linear translation of the cam roller along the guide slot.

The brake apparatus may further include an intermediary roller disposed between the lock roller and the cam roller, where the cam roller is movable within the guide slot to effect movement of the lock roller via direct engagement with the intermediary roller.

According to the second aspect of the invention, a brake apparatus for restricting rotation of a rotatable member includes a brake gear operatively rotatable with the rotatable member about an axis of rotation of the brake gear, at least one jaw member having at least one tooth for meshing with at least one tooth of the brake gear to restrict rotation of the brake gear, and a guide rail assembly having opposed parallel surfaces configured for guiding the at least one jaw member for slideable movement between the opposed parallel surfaces. The guide rail assembly is fixable against rotation relative to a support of the rotatable member supporting the rotatable member for rotation. The brake apparatus also includes a cam follower movable to effect movement of the at least one jaw member, and at least one actuator plate selectively rotatable about the axis of rotation of the brake gear, wherein the at least one actuator plate rotates relative to the guide rail assembly to effect movement of the cam follower thereby effecting movement of the at least one jaw member between an unlocked position spaced from the brake gear and a locked position engaging the brake gear.

The cam follower may be in the form of a roller received in the jaw member.

The at least one actuator plate may include a cam slot that receives the cam follower.

The cam slot may be a linear slot that bounds the cam follower.

The cam slot may have a locking portion that engages the cam follower when the cam follower is moved fully inwardly towards the axis of rotation along a translation axis orthogonal to the axis of rotation, the locking portion of the cam slot extending longitudinally along a plane of the at least one actuator plate along a locking axis set orthogonal to the translation axis when the cam follower is moved fully inwardly towards the axis of rotation, thereby restricting unintentional rotation of the at least one actuator plate.

The at least one actuator plate may be a primary actuator plate and further including a secondary actuator plate coupled to the primary actuator plate for rotation therewith about the axis of rotation of the brake gear, wherein the opposed parallel surfaces of the guide rail assembly are transposed between the primary and secondary actuator plates.

The at least one jaw member may be jointly guided along a translation axis orthogonal the axis of rotation between the opposed parallel surfaces of the guide rail assembly and between the opposed primary and secondary actuator plates.

The jaw member may be transposed between the opposed parallel surfaces for translation along a translation axis orthogonal to the axis of rotation of the brake gear.

The at least one actuator plate may be rotatably coupled to the guide rail assembly.

The opposed parallel surfaces may define a guide slot through which the jaw member is moved, the guide slot being aligned vertically.

The guide rail assembly may include opposing rails each including one of the opposed parallel surfaces and each being separately fixable relative to a support of the rotatable member.

The brake gear may have a plurality of radially outwardly protruding gear teeth circumferentially spaced around the axis of rotation of the brake gear, wherein the at least one tooth of the at least one jaw member is shaped to engage a root between adjacent crests of the gear teeth.

The at least one jaw member may be a primary jaw member, and may further include a secondary jaw member disposed opposite the primary jaw member, wherein the primary and secondary jaw members are each slideably guided between the opposed parallel surfaces.

The brake apparatus may be in combination with a transmission having the rotatable member and a support supporting the rotatable member for rotation in the support.

Also according to the second aspect of the invention, another brake apparatus for restricting rotation of a rotatable member includes a brake gear operatively rotatable with the rotatable member about an axis of rotation of the brake gear, at least one jaw member having teeth for meshing with teeth of the brake gear to restrict rotation of the brake gear, and a guide rail assembly having opposed parallel surfaces for guiding movement of the at least one jaw member. The at least one jaw member is transposed therebetween, where the guide rail assembly is fixable relative to a support of the rotatable member against rotation relative to the support. The brake apparatus further includes a cam follower received by the at least one jaw member, and opposed actuator plates selectively rotatable about the axis of rotation of the brake gear and each having a cam slot receiving the cam follower, wherein the actuator plates rotate together relative to the guide rail assembly to effect movement of the cam follower within the cam slot, thereby effecting translation of the at least one jaw member along a translation axis orthogonal to the rotation axis, the jaw member being moved between an unlocked positions spaced from the brake gear and a locked position engaging the brake gear.

The cam follower may be in the form of a roller received in the jaw member.

The cam slots may each have a locking portion that engages the cam follower when the cam follower is moved fully inwardly towards the axis of rotation along the translation axis, each locking portion extending longitudinally along a plane of the respective actuator plate along a respective locking axis set orthogonal to the translation axis when the cam follower is moved fully inwardly towards the axis of rotation, thereby restricting unintentional rotation of the actuator plates.

The brake apparatus may further include opposed jaw members oppositely disposed about the brake gear and opposed cam followers each received by a respective jaw member of the opposed jaw members.

The opposed parallel surfaces of the guide rail assembly may be transposed between the opposed actuator plates.

The at least one jaw member may be jointly guided along a translation axis orthogonal the axis of rotation between the opposed parallel surfaces of the guide rail assembly and between the opposed actuator plates.

The foregoing and other features of the invention are hereinafter described in greater detail with reference to the accompanying drawings.

DETAILED DESCRIPTION

The principles of the present application have particular application to mowers, such as zero-turn-radius mowers, and thus will be described below chiefly in this context. It will of course be appreciated and also understood that the principles of the invention may be useful in other vehicles, such as vehicles utilizing mechanical, hydrostatic, hydraulic, or electric drive systems, or with any equipment requiring restriction of rotation of a component, such as upon demand.

Figure 1:
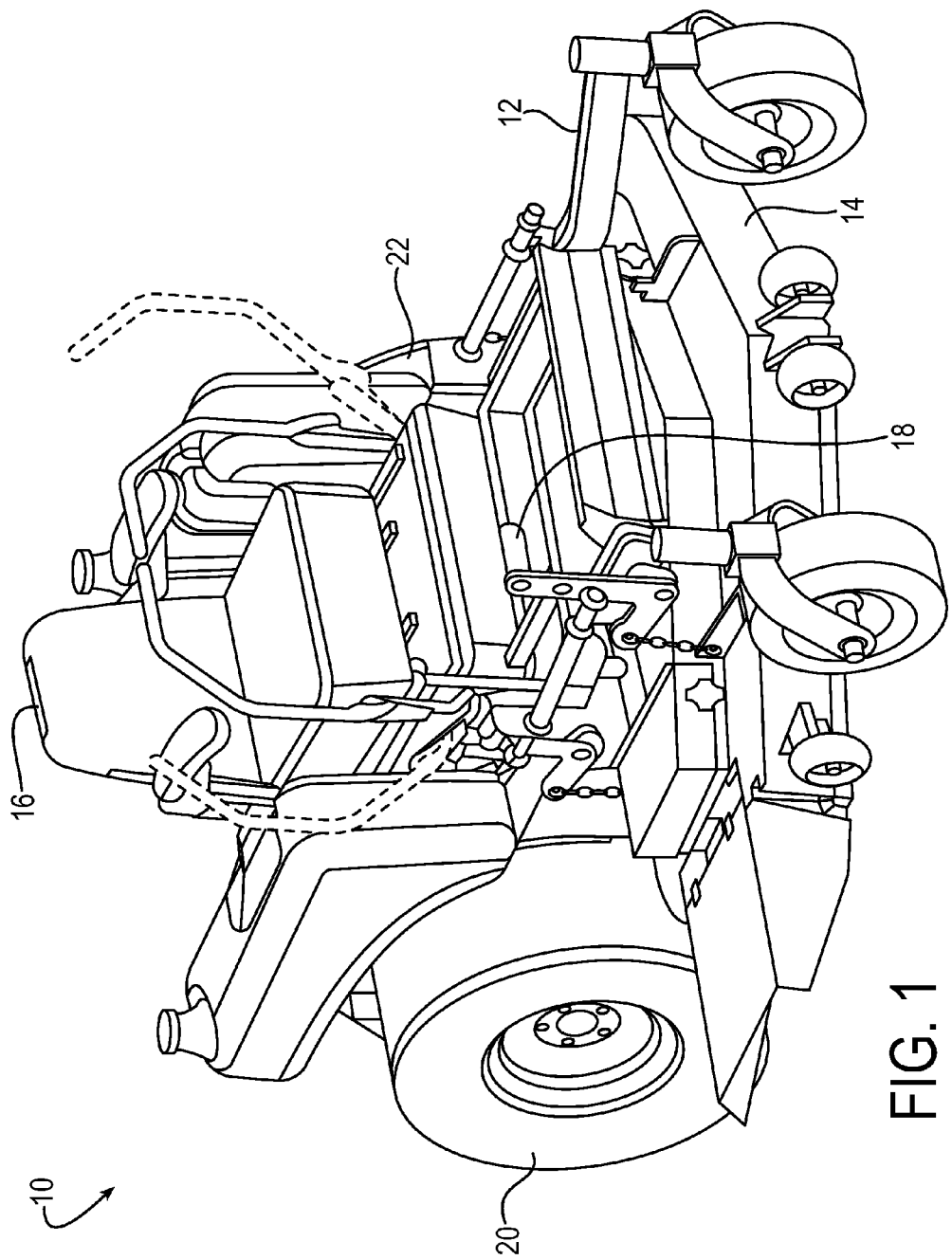
FIG. 1 is a perspective view of an exemplary zero-turn-radius mower.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 18 for operating the mower 10. A rear mounted engine (not shown) mounted to the frame 12 behind the seat 16 provides power to a hydraulic axle combination mounted to the frame 12, the hydraulic axle combination including hydrostatic transmissions, such as a left-hand hydrostatic transmission 30 (FIG. 2) and a right-hand hydrostatic transmission (not shown). The hydrostatic transmissions can be controlled by an operator to independently drive respective rear wheels 20 and 22 to propel the mower and provide zero-turn-radius functionality.

The plurality of controls 18 may include a brake actuator for operator-initiated actuating of a brake apparatus of at least one of the hydrostatic transmissions. The operator-actuated brake actuator may be mechanical, electric, hydraulic, magnetic, pneumatic, or any suitable combination thereof. Alternatively, in other embodiments the brake actuator may be omitted and the brake apparatus may be actuated automatically. The design of the illustrated mower 10 is merely exemplary in nature, and it will be appreciated that other mower designs and vehicle types can be used in accordance with the invention.

Figure 2:
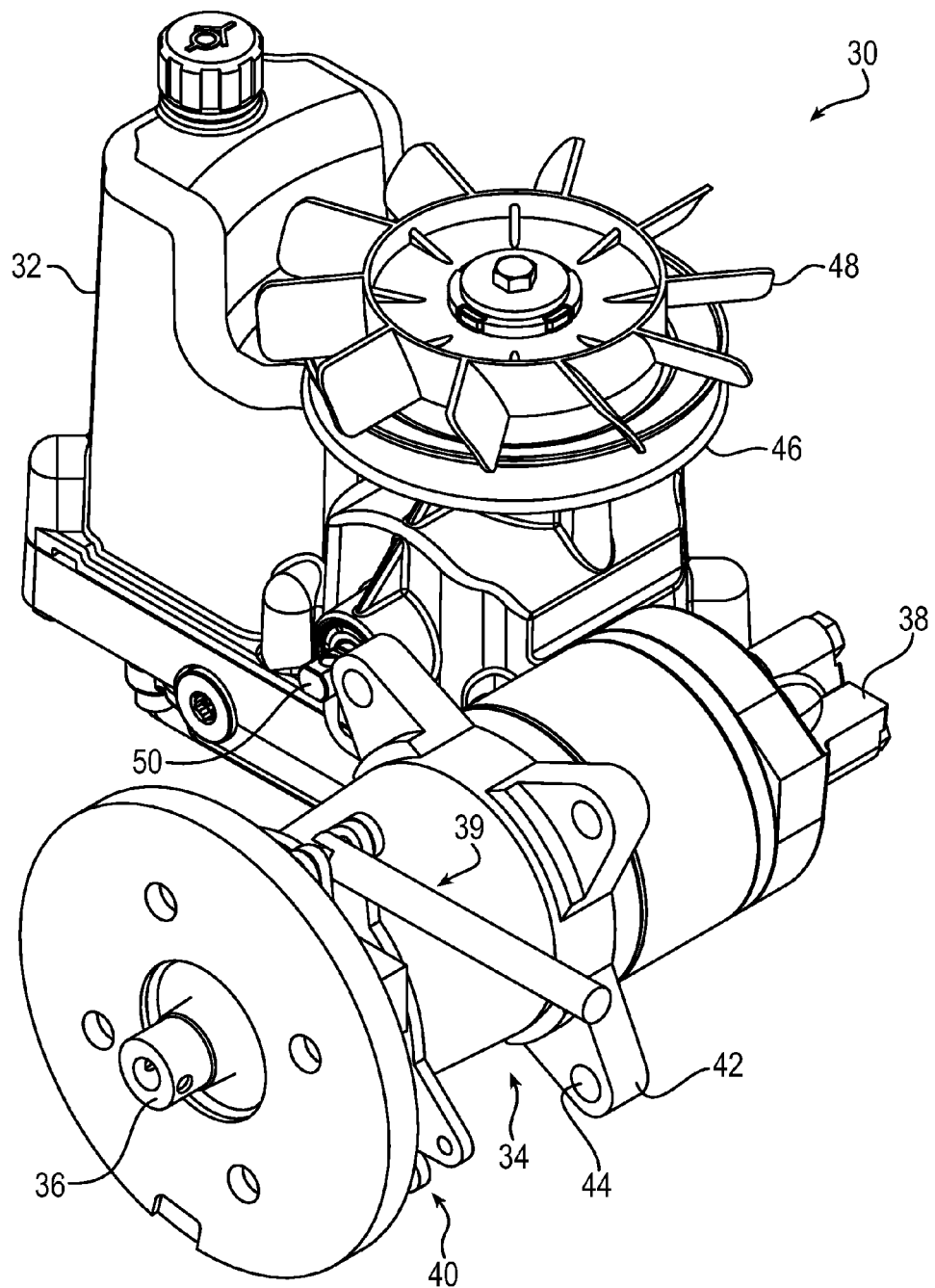
FIG. 2 is a front perspective view of a hydrostatic transmission including an exemplary brake apparatus according to the invention.
Figure 3:
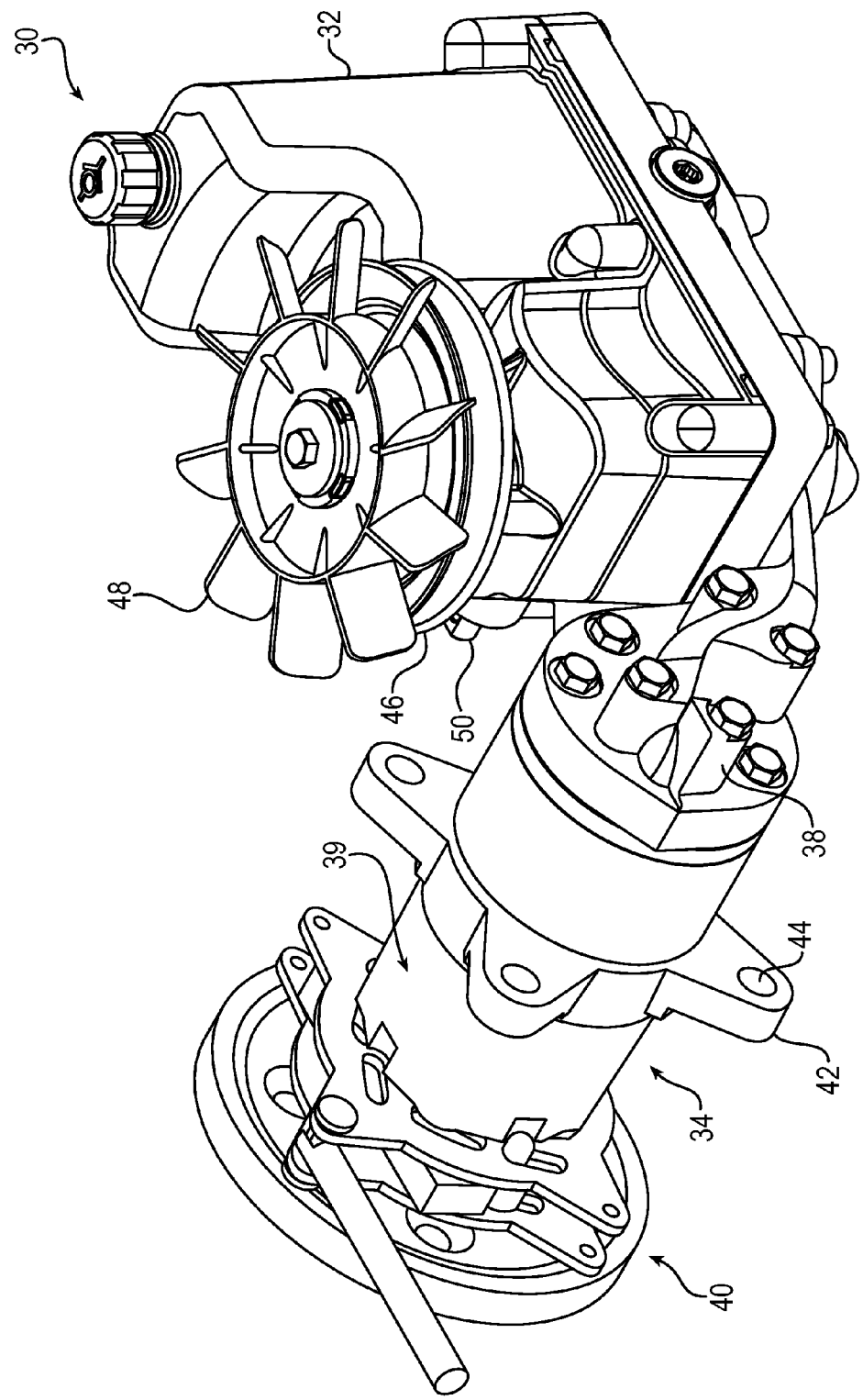
FIG. 3 is a rear perspective view of the hydrostatic transmission including the exemplary brake apparatus according to the invention.

Turning now to FIGS. 2 and 3, the transmission 30 includes a reservoir housing 32 that houses a hydraulic pump, a motive device such as a hydraulic motor 34 that includes an output shaft 36 that can act as an axle shaft or be coupled to an axle shaft, and a porting manifold 38 including a pump mount surface and a motor mount surface.

The hydraulic pump, which may be any suitable pump such as a variable displacement piston pump, has an input shaft projecting from the reservoir housing 32 to which an input wheel 46 and a cooling fan 48 may be attached, and a trunnion shaft 50 extending through the housing 32. The input wheel 46, as shown, may be a pulley about which a drive belt can be trained as is customary for driving a pump off of an engine. Alternatively, other types of drive wheels may be employed, such as a sprocket for use with a chain drive. It is noted, however, that pulley drives are more customary in the zero-turn-radius art.

The motor 34, which may be any suitable motor such as a low speed, high torque hydraulic motor, is provided with attachment lugs 42 having through holes 44 for receiving fasteners for mounting the motor 34, and more particularly the entire transmission 30, to the mower 10. As used herein, coupling may refer to direct or indirect coupling.

The output shaft 36 is supported in a shaft support 39 of the motor 34. The shaft support 39 may have any suitable bearings or bushings for enabling efficient rotation of the output shaft 36.

A brake apparatus 40 is provided for being actuated to restrict, and preferably to prevent, rotation of the wheel 20 as described below. One or more brake apparatuses 40 may be included. The components of the brake apparatus 40 may be used for both left-side and right-side brakes. Preferably, the mowing machine 10 includes separately drivable wheels 20 and 22, each of which may be braked by a separate brake apparatus 40. And thus one of the wheels 20 or 22 may be braked while the other may still rotate.

It will be appreciated that the brake apparatus 40 may be configured to brake the wheel 20 or 22 by being coupled to any suitable rotatable member of a drive train driving the wheel 20 or 22. In the depicted embodiment, the brake apparatus 40 is coupled to the motor 34. The brake apparatus 40 is coupled to a rotatable member, such as the output shaft 36, which is in turn coupled to the wheel 20. Thus, upon actuatable engagement of the brake apparatus 40, the brake apparatus 40 is preferably configured to stop turning of the wheel 20.

In some embodiments, such rotatable member may not be the output shaft 36, and the rotatable member instead may be operably coupled to the output shaft 36, directly or indirectly via a gear train, friction wheel train, chain drive, or belt drive. In some embodiments, the brake apparatus 40 may be coupled to a non-powered rotatable member rather than to a driven rotatable member, such as the axle of a non-driven wheel of the vehicle.

In some embodiments, the brake apparatus 40 may be coupled to an alternative motive device for driving a wheel of a vehicle, such as an axial piston motive device. In the case of the mowing machine 10, a brake apparatus 40 may be coupled to and configured to brake the hydraulic pump. In such case the brake apparatus 40 may be coupled to any suitable rotatable member of the hydraulic pump.

It will be appreciated that the brake apparatus 40 in other embodiments may be configured to brake an alternative axial piston motive device, such as an axial piston motor or axial piston pump. The axial piston motive device braked by a brake apparatus 40 may be included in a vehicle, such as a mowing machine, such as for driving a wheel 20. In other embodiments, an axial piston motive device braked by a brake apparatus 40 may not be provided for driving a wheel, and/or the axial piston motive device may not be included in a vehicle.

Figure 4:
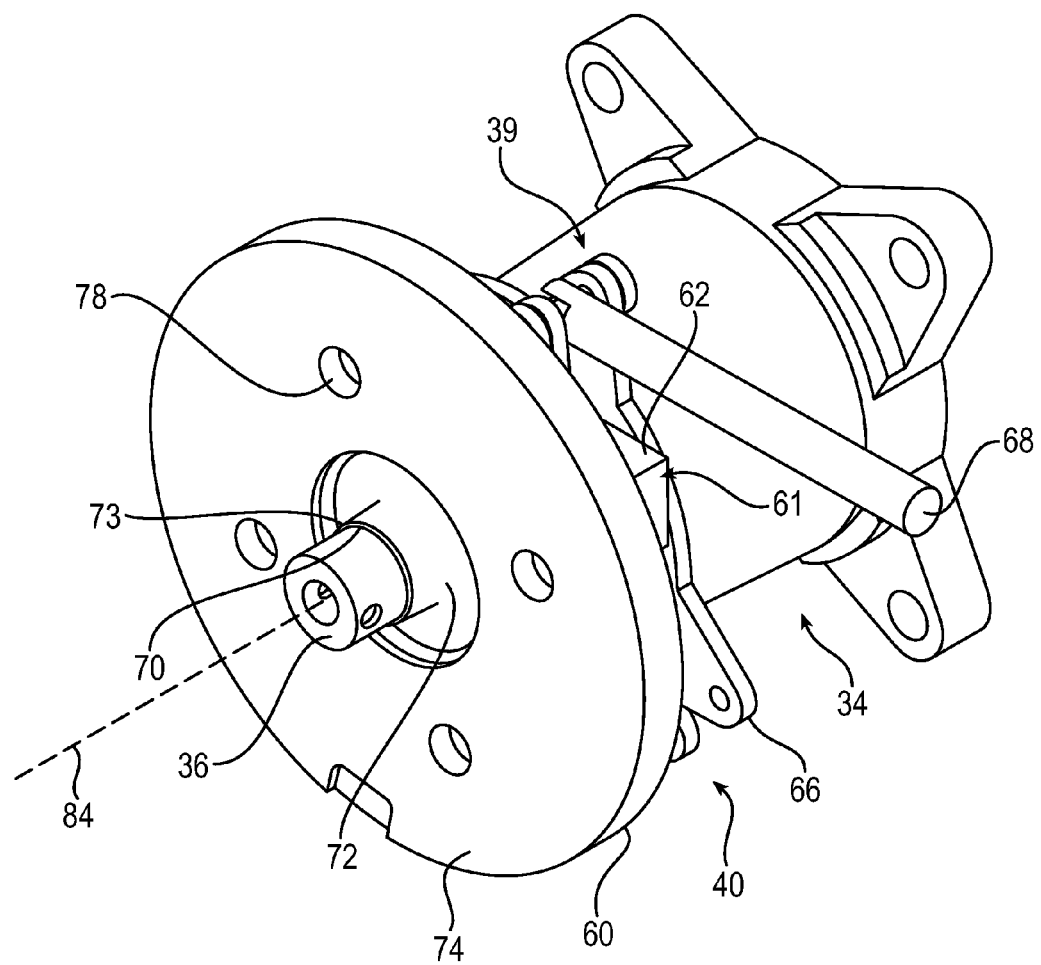
FIG. 4 is a front perspective view of the exemplary brake apparatus of FIG. 2.
Figure 5:
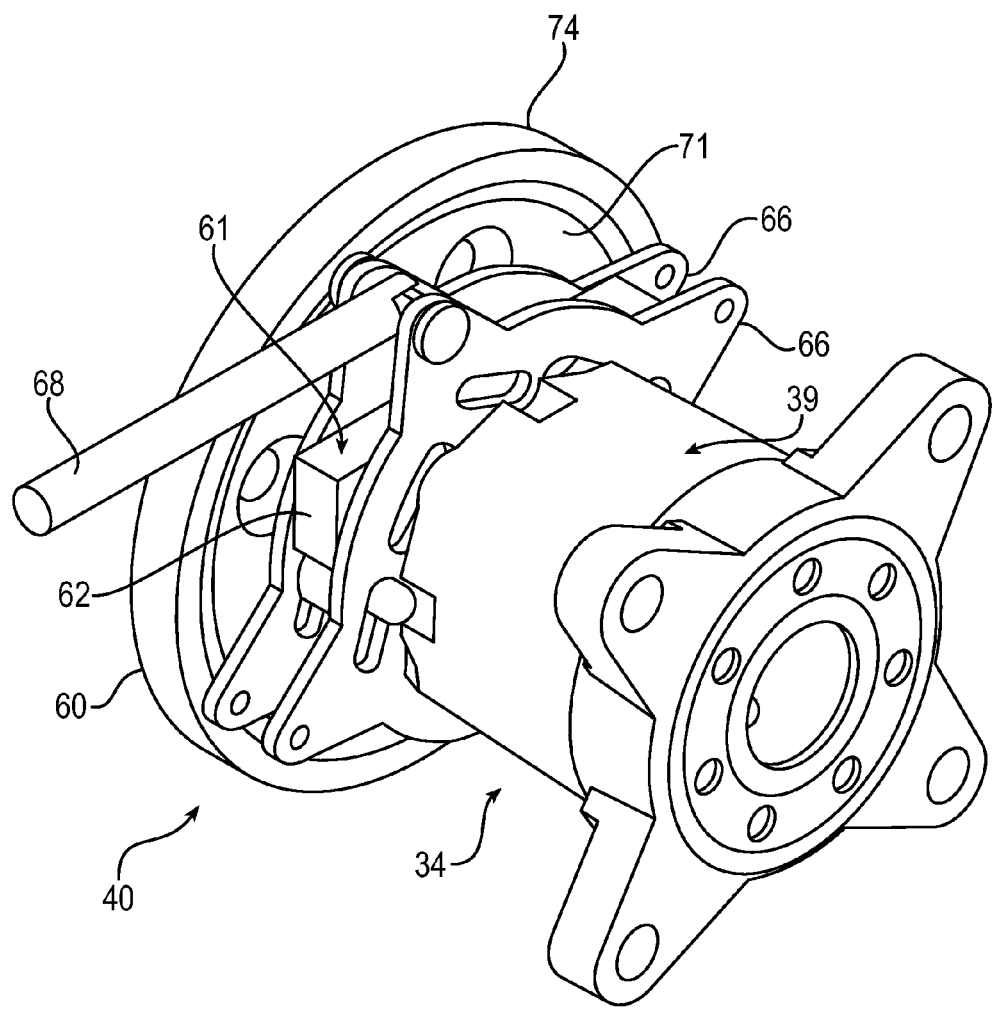
FIG. 5 is a rear perspective view of the exemplary brake apparatus of FIG. 2.
Figure 6:
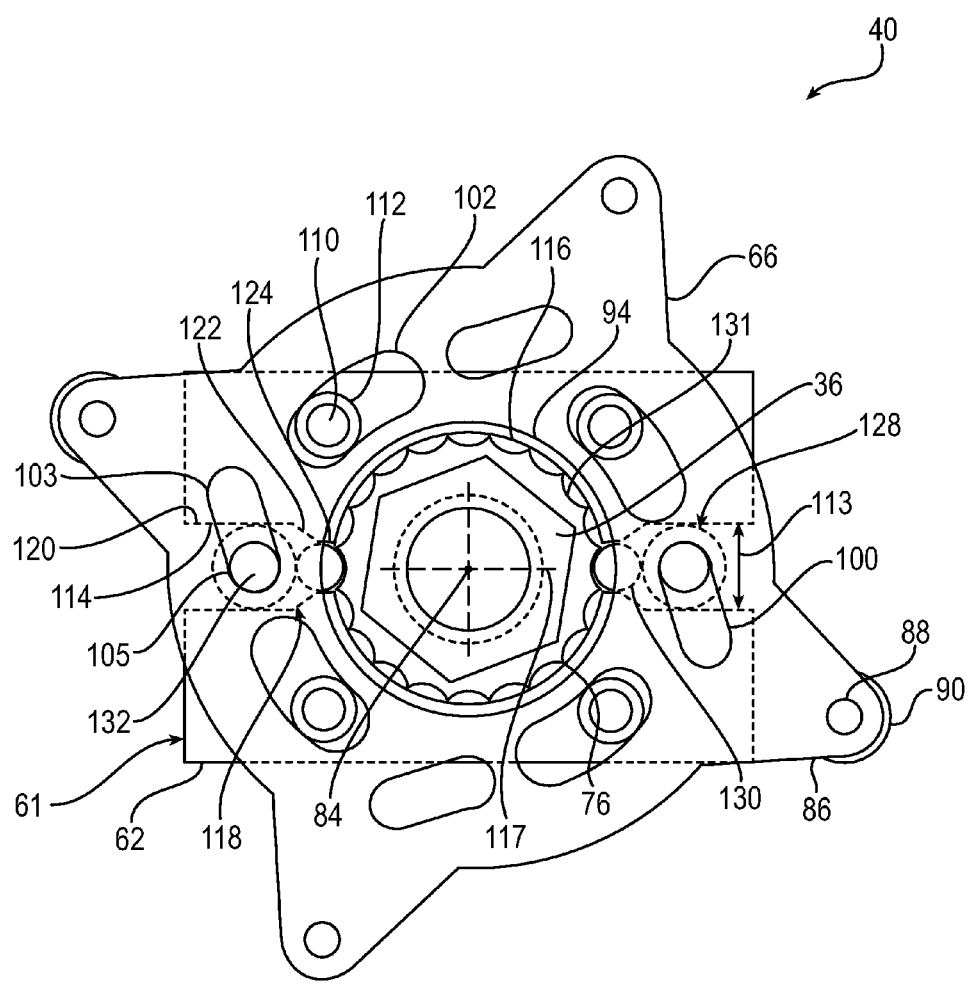
FIG. 6 is a partial front elevational view of the exemplary brake apparatus of FIG. 2.
Figure 7:
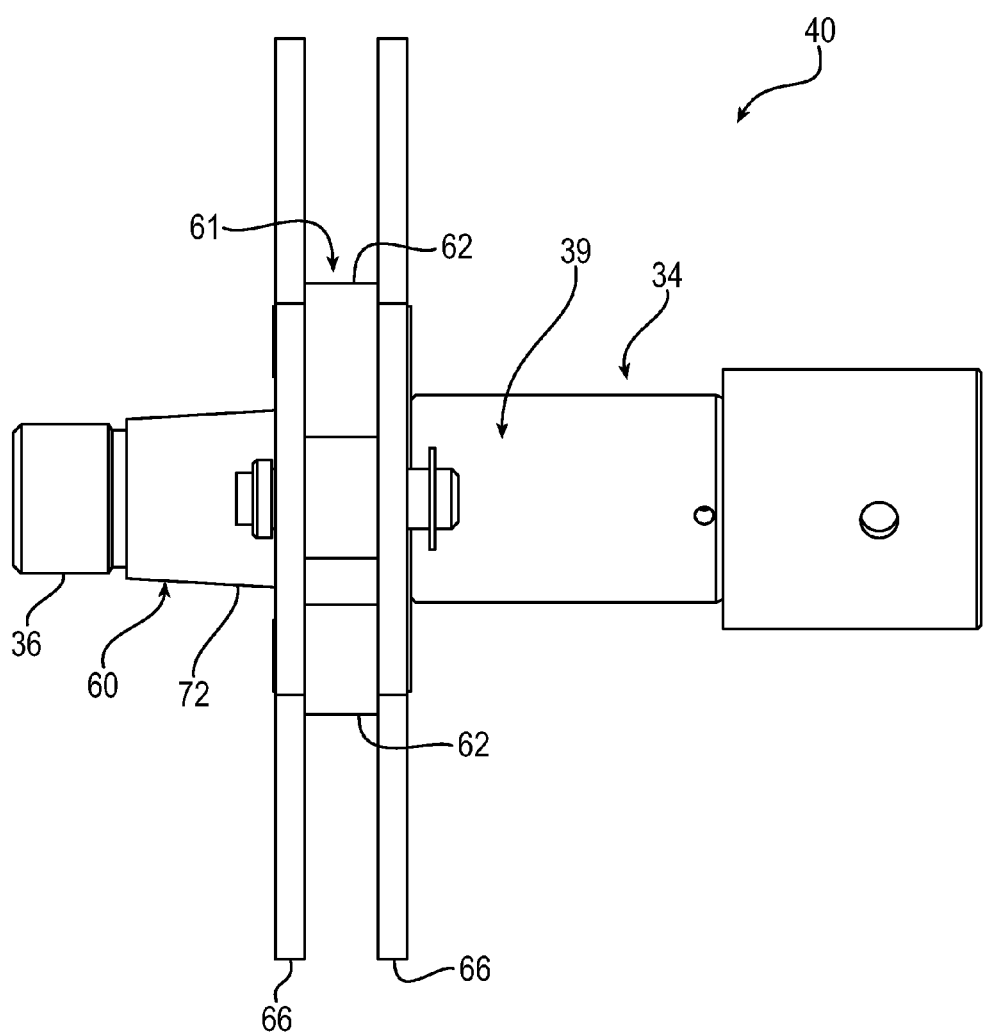
FIG. 7 is a partial side elevational view of the exemplary brake apparatus of FIG. 2.

Turning now to FIGS. 4 and 5, the exemplary brake apparatus 40 will be discussed in detail. The brake apparatus 40 may include a hub 60 for mounting the respective wheel 20 (FIG. 1), and a guide rail assembly 61 including one or more guide rails 62 for mounting the brake apparatus 40 to the respective equipment, such as a vehicle, such as to the shaft support 39 or to the motor 34. The brake apparatus 40 may also include one or more actuator plates 66, and an actuator member 68 coupled to the one or more actuator plates 66. The hub 60, also herein referred to as a brake gear 60, is coupled to the output shaft 36 such that the brake gear 60 rotates with the output shaft 36.

As shown in FIGS. 4-8, the brake gear 60 is operatively coupled to the output shaft 36 for rotation with the output shaft 36 about a rotational axis 84 of the brake gear 60. As illustrated, the axis of rotation of the output shaft 36 is collinear with the rotational axis 84, also herein referred to as the axis of rotation 84. The brake gear 60 includes a hub portion 72 and a flange portion 74 extending axially outwardly from an inward side 71 of the hub portion 72. The brake gear 60, and in particular the flange portion 74 and the hub portion 72, include a hole 73, such as a keyed hole, extending axially therethrough for receiving the output shaft 36. One or both of the flange portion 74 and the hub portion 72 may be coupled to the output shaft 36, such as via welding, fasteners, etc.

In the depicted embodiment, the flange portion 74 has a plurality of holes 78 for receiving wheel lugs for mounting the wheel 20. The hub portion 72 has, axially inwardly from the flange portion 74, a plurality of teeth 76, and preferably radially outwardly protruding teeth, such as circumferentially spaced around the rotational axis 84. The teeth 76 are provided for meshing with a respective mating member to restrict rotation of the brake gear 60 and thus also the output shaft 36 and associated wheel 20 or 22, to be further explained.

The teeth 76 may be integral with the hub portion 72 or coupled to the hub portion 72 in any suitable manner. Additionally, or alternatively, the teeth 76 may be provided on the output shaft 36, on heads of wheel studs, or projections from the wheel studs. The teeth 76 may have any suitable shape, for example to maximize holding torque while permitting a smooth release. The teeth 76 may be treated to increase interaction between the teeth 76 and a respective mating member. Additionally, or alternatively the teeth 76 and other contact surfaces of the brake apparatus 40 may be treated or coated to reduce friction.

Also rotatable about the rotational axis 84 are the one or more actuator plates 66. The depicted embodiment includes two actuator plates 66, although any suitable number of actuator plates may be used. The actuator plates 66 preferably are identical and are coupled to one another for joint rotation about the rotational axis 84. The plates 66 are configured for rotational movement separate from the brake gear 60, to be further detailed. It will be appreciated that in other embodiments, the actuator plates 66 may not be identical.

In the illustrated embodiment, the actuator plates 66 jointly cooperate with the guide rail assembly 61 to effect engagement and disengagement of the brake apparatus 40. The actuator plates 66 are coupled, such as rotatably coupled, to the guide rail assembly 61, to be further explained.

The actuator plates 66 are disposed to either side of the guide rail assembly 61 such that the guide rail assembly 61 is transposed between the actuator plates 66. An inward actuator plate is disposed at an inward side of the guide rail assembly 61 adjacent the shaft support 39, while an outward actuator plate is disposed at an outward side of the guide rail assembly 61 adjacent the wheel 20.

Each depicted actuator plate 66 includes a flange portion 86 for engaging the actuator member 68. As shown only one set of flange portions 86 is included for coupling to the actuator member 68, though additional sets may be provided for ease of mounting and assembling for left and right transmissions. In other embodiments, more than one set of flange portion 86 may be coupled to the actuator member 68 or to an additional actuator member 68.

As shown, the flange portions 86 include through holes 88, such as for receiving a fastener, where the fastener may also be received in the actuator member 68. A bushing may be disposed between the set of flange portions 86, to support the actuator plates 66 relative to one another and to space the plates from the guide rail assembly 61 to restrict binding therebetween. The bushing may be supported relative to the flange portions 86 by the fastener, not shown, such as a bolt secured by a nut.

The actuator member 68 is shown as a rod which may be coupled to additional structure, such as a cable, in turn coupled to the plurality of controls 18 (FIG. 1), such as to an electric actuator or to an actuation lever. In other embodiments, the actuator may not be located for operator actuation, and thus the actuator member 68 may be coupled to an automatic actuation system. While the actuator member 68 is shown as a rod, any other suitable member may be used, such as a cable attached to the actuator plates, such as via a fastener mounted between opposing flange portions 86.

Returning to the actuator plates 66, each plate 66 has a gear hole 94, and preferably a generally circular gear hole, extending through the plate 66, and preferably through the center of the plate 66, for receiving at least the output shaft 36. The hub portion 72, including the teeth 76 may also be received through at least the outward actuator plate 66. As shown, the hub portion 72 extends through each of the outward actuator plate 66, the guide rail assembly 61, and the inward actuator plate 66.

Referring now to the outward actuator plate 66 but applicable to the inward actuator plate 66, the plate 66 has a thickness that is preferably substantially less than the smallest outer diameter of the plate 66. Circumferentially disposed about the gear hole 94 and extending through the thickness of the actuator plate 66 are one or more plate slots 100 and one or more rotation slots 102.

The rotation slots 102 provide for guiding the rotation of the plate 66 about the rotational axis 84, relative to the guide rail assembly 61. The rotation slots 102 are each circumferentially spaced, and preferably equally circumferentially spaced, from one another about a center rotational axis of the plate 66. The center rotational axis of the plate 66 is collinear with the rotational axis 84 when assembled in the brake apparatus 40.

The rotation slots 102 extend along a circular path disposed about the gear hole 94 and having a center axis collinear with the rotational axis 84. The rotation slots 102 have a generally curved shape and extend fully through the thickness of the plate 66. While four rotation slots 102 are illustrated, any suitable number may be included. Also, while each of the four rotation slots 102 are identical to one another, one or more of the rotation slots 102 may extend for a greater length along the circular path than the other of the rotation slots 102. Turning now to the plate slots 100, these slots are provided to effect locking and unlocking of the brake gear 60 upon rotation of the actuator plates 66. Like the rotation slots 102, the plate slots 100 extend through the thickness of the plate 66 and are also circumferentially disposed about the central rotational axis of the plate 66. Four plate slots 100 are illustrated, alternately interdisposed between the rotation slots 102. In other embodiments, any suitable number of plate slots 100, one or more, may be included, and the one or more plate slots 100 may be disposed between the rotation slots 102 in an alternating arrangement or provided in a different arrangement relative to the rotation slots 102.

As depicted, additional plate slots 100 may be included in the actuator plates 66, though may not be used. The additional plate slots 100 may be included to increase ease of manufacturing by alignment of an actuator plate 66 in any of four rotated positions during manufacturing.

Figure 8:
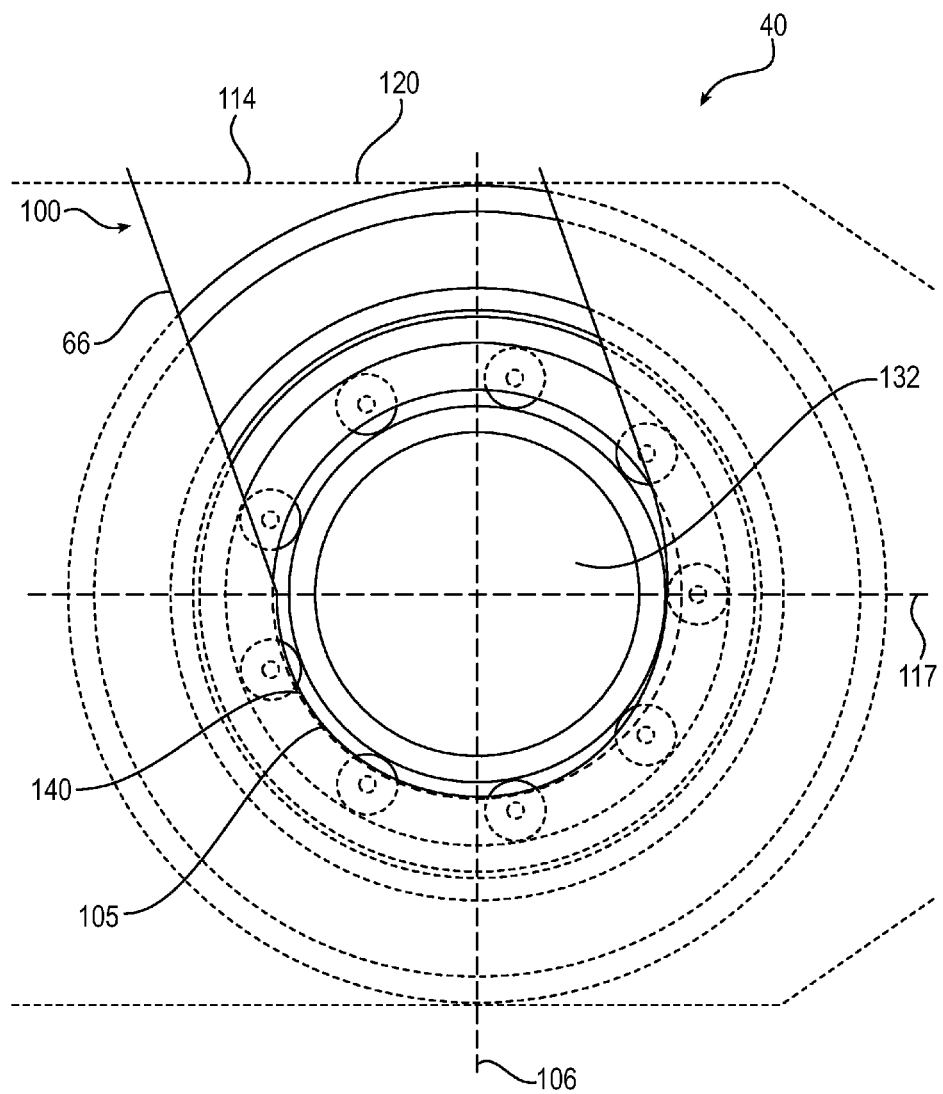
FIG. 8 is a partial magnified view of the exemplary brake apparatus of FIG. 2.

The plate slots 100, also herein referred to as cam slots 100, each have a camming portion 103 and a locking portion 105, as shown in detail in FIG. 8. With respect to a single cam slot 100, the camming portion 103 generally extends linearly along the plate 66. The locking portion 105 is generally integral with the camming portion 103 and extends along a locking axis 106 that is angularly offset from the axis along which the respective camming portion 103 extends. The camming portion 103 is configured, such as being shaped, to cooperate with the guide rail assembly 61 to assist in maintaining locking of the brake apparatus 40.

The depicted guide rail assembly 61 includes two guide rails 62 disposed between adjacent actuator plates 66. While the illustrated guide rail assembly 61 includes two guide rails 62 spaced from one another, the guide rails 62 may be integral with one another in other embodiments. Any suitable number of guide rails 62, one or more, may be included in the guide rail assembly 61, and the guide rails may have any suitable outer shape and/or thickness.

The guide rails 62 include fastener holes extending therethrough for receiving fastening members 110, such as mounting bolts. The fastening members 110 extend through each of the actuator plates 66 and the guide rail assembly 61, and are received, such as threadedly received, into the motive device, such as the shaft support 39. This fastening enables attachment of the brake apparatus 40 to the transmission 30 and aligns each of the guide rail assembly 61 and actuator plates 66 generally along the rotational axis 84. The fastening also prevents rotation of the guide rail assembly 61 relative to the actuator plates 66 and motor 34, and further restricts component rattling, for example due to clearances.

Received on each fastening member 110 is a rotation member 112, such as a bearing or bushing. In cooperation with the rotation members 112, the fastening also spaces, such as axially fixes the guide rail assembly 61 relative to the shaft support 39 such that the guide rail assembly 61 is fixedly separated from the shaft support 39 along the fastening members 110 via the rotation members 112. More particularly, the rotation members 112 along with the fastening members 110 support rotation of the actuator plates 66 relative to the guide rail assembly 61.

As depicted, one rotation member 112 is disposed along the respective fastening member 110 on each side of the guide rail assembly 61, between the guide rail assembly 61 and the respective actuator plate 66. Though in other embodiments only one rotation member 112 may be received along each fastening member 110 and also extend through the guide rail assembly 61. In such embodiments, the guide rail assembly 61 may not be fixedly coupled via the fastening member(s) 110 and may be otherwise fixed relative to the housing of the motor 34. In even other embodiments, one or more rotation members 112 may be omitted and the respective fastening members 110 may directly slidably engage the rotation slots 102.

It will be appreciated that the rotation members 112, while supporting rotation, may themselves be fixedly coupled to the respective fastening members 110 to prevent rotation of the rotation members. In other embodiments, the rotation members 112 may be omitted and the fastening members 110 may include spacing portions extending radially outwardly to separate and abut each of the guide rail assembly 61 and the motor 34.

Each rotation slot 102 of the actuator plates 66 is sized to receive a rotation member 112 slideably coupled between the actuator plates 66 and the guide rail assembly 61. This coupling allows for rotatable coupling of the actuator plates 66 to the guide rail assembly 61, which is fixed relative to the rotatable actuator plates 66. The actuator plates 66 are allowed to minimally axially translate together along the rotation members 112. For example, the fixed axial distance along the rotational axis 84 between the guide rail assembly 61 and the adjacent portion of the motor 34 or shaft support 39 may be greater, such as slightly greater, than the thickness of the actuator plate 66 disposed therebetween. This relative spacing allows for minimal translation of the actuator plates 66 along the rotational axis 84, thereby minimizing binding of the actuator plates 66 during their rotation about the rotational axis 84. It will be appreciated that the actuator plates 66 are retained relative to one another via their positioning along the rotational axis 84 between the brake gear 60 and the shaft support 39.

It will be appreciated that in some embodiments, one or more actuator plates 66 may be supported, such as radially supported, separate from the guide rail assembly 61, including separate from the rotation members 112 and the fastening members 110, though the one or more actuator plates 66 will maintain rotation about the rotational axis 84 or about an axis of rotation collinear with the axis of rotation 84. In some embodiments, the rotation slots 102 of the one or more actuator plates 66 may not receive the rotation members 112 and the fastening members 110 and/or the rotation slots 102 may be omitted. Where the one or more actuator plates 66 are not supported by the guide rail assembly 61, the one or more actuator plates 66 may instead be supported via another suitable method, such as via the gear hole 94 corresponding to the output shaft 36 such that the output shaft 36 remains separately rotatable relative to the one or more actuator plates 66. Another suitable alternative includes support via a bushing or bearing disposed between the output shaft 36 and the one or more actuator plates 66. Another suitable alternative includes support via additional or alternative support members extending from the motor housing of the motor 34, such as from the shaft support 39.

Turning again to the illustrated guide rail assembly 61, a gap 113 is included between the two guide rails 62. The gap 113 defines two guide slots 114 oppositely disposed about a passage 116 extending through the guide rail assembly 61 generally along the rotational axis 84. The passage 116 is provided for receiving the output shaft 36 and preferably also the brake gear 60. In another embodiment where the guide rail assembly 61 includes a single guide rail 62, the respective guide slots 114 may extend through the single guide rail. It will be appreciated that the two guide slots 114 may be referred to as a guide slot 114. The illustrated guide slots 114 extend along a translation axis 117 that is transverse the axis of rotation 84 of the brake gear, such as being orthogonal to the axis of rotation 84. Further the translation axis 117 and axis of rotation 84 intersect.

Each guide slot 114 includes a radially inward slot portion 118 and a radially outward slot portion 120 with respect to the rotational axis 84. The radially outward slot portion 120 is defined by opposed generally parallel surfaces, while the radially inward slot portion 118 is defined by an inclined portion 122 and a restraining portion 124.

The restraining portion 124 is disposed adjacent the brake gear 60, and preferably adjacent the teeth 76, and is at least partially defined by the passage 116. The restraining portion 124 is also defined by opposed curved surfaces of the guide rails 62. The restraining portion 124 is radially inwardly disposed relative to the inclined portion 122, which is thus disposed between the restraining portion 124 and the radially outward slot portion 120. The inclined portion 122 has opposed inclined surfaces angled radially inwardly towards one another. A radially outward-most end of the inclined portion 122 has a greater width across the guide slot 114 than a width across the guide slot 114 at a radially inward-most end of the inclined portion 122.

Each portion of the illustrated guide slots 114 is shaped to engage a lock assembly 128 that is jointly engaged between a guide slot 114 and a cam slot 100 overlapping the guide slot 114. Each guide slot 114 is provided for retaining and guiding the respective lock assembly 128, of which two lock assemblies are depicted. The two lock assemblies 128 are disposed opposite one another about the rotational axis 84 to provide for balanced locking of the brake gear 60. In other embodiments, only one lock assembly 128 may be used, though such alternative arrangement may provide a less-balanced resistance of unlocking forces as that provided by two lock assemblies 128 each oppositely disposed in a guide slot 114.

More generally, the depicted actuator plates 66 and guide rail assembly 61 jointly engage each of the illustrated lock assemblies 128 to provide for engagement and disengagement of at least a portion of each of the lock assemblies 128 with the brake gear 60. Each of the two illustrated lock assemblies 128 includes an engagement member, such as a lock roller 130, and a cam follower 132, also herein referred to as a cam roller 132, that are cooperatively engageable for effecting locking of the brake gear 60. Particularly, the lock roller 130 and cam roller 132 are cooperatively slideable in the respective guide slot 114.

Each of the lock roller 130 and cam roller 132 have generally rounded, and preferably cylindrical, surfaces for engaging one another and the guide rail assembly 61. This construction reduces surface contact and thus friction between components by providing generally line-to-line engagement between the lock roller 130 and the cam roller 132, and also between the surfaces of the respective guide slot 114 and the rollers 130 and 132. In other embodiments, the lock roller 130 and/or the cam roller 132 may have any other suitable shape, such as being spherical and thus providing point-to-point contact.

Referring now to a single lock assembly 128, the lock roller 130 is provided for meshing with the brake gear 60 to restrict rotation of the brake gear 60. The depicted lock roller 130 is a generally cylindrical pin that is shaped to engage the root 131 between adjacent crests, e.g. teeth 76, of the brake gear 60. When the lock roller 130 is engaged with a root 131 and the restraining portion 124, the brake gear 60 is restricted or altogether prevented from rotating about the rotational axis 84.

The lock roller 130 is radially restrained in the respective guide slot 114 by the cam roller 132 and axially restrained via a face of each actuator plate 66. The cam roller 132 has a greater diameter in the guide slot 114, than a diameter of the lock roller 130 in the guide slot 114, and thus retains the lock roller 130 radially inwardly of the cam roller 132 in the guide slot 114.

Movement of the lock roller 130 is effected by the cam roller 132, and more particularly via rotation of the actuator plates 66 relative to the guide rail assembly 61. The guide rails 62 are configured, such as being shaped, to guide the lock roller 130 between the locked position engaged with the brake gear 60 and the unlocked position spaced from the brake gear 60. The lock roller 130 is moved inwardly towards the brake gear 60 along the guide slot 114 via engagement, such as direct engagement, with the cam roller 132, and is allowed to move outwardly away from the brake gear 60 via opposite movement of the cam roller 132.

The cam roller 132 is movable to effect movement of the respective lock roller 130, and is disposed radially outwardly of the lock roller 130 with respect to the rotational axis 84. The depicted cam roller 132 includes a needle bearing disposed about a roller, such as a pin. In other embodiments, one or more cam rollers 132 may include a bushing, a bearing such as a roller bearing, sleeve bearing or needle bearing, or the bearing/bushing may be omitted, and/or the roller may have a rod or tubular shape.

The cam roller 132 is jointly engaged, such as being slideably coupled, in the cam slot 100 of the outermost actuator plate 66, and preferably also the innermost actuator plate 66, and in the respective guide slot 114. A portion of the cam roller 132 disposed between the actuator plates 66, such as the pin of the cam roller 132 about which the bearing is disposed, is preferably coupled to end caps or snap rings at opposite axial ends of the cam roller 138, such as opposite axial ends of the pin. One of the end caps or snap rings is thus disposed adjacent each of the actuator plates 66. In this way, the actuator plates 66 are axially maintained along the cam rollers 132 relative to one another. Though the actuator plates 66 may axially translate minimally relative to one another along the cam rollers 132 and along the fastener received through the bushing 90 and the flange portions 86.

During rotation of the actuator plates 66 about the rotational axis 84, the cam roller 132 is jointly engaged by the actuator plates 66 and the guide rails 62 to move the cam roller 132 inwardly and outwardly toward the rotational axis 84. Particularly, the cam roller 132 is translated along the translation axis 117 and is guided by the radially outward slot portion 120 during the translation. In this way, rotation of the actuator plates 66 is converted into linear movement of the cam roller 132 along the translation axis 117.

Figure 9:
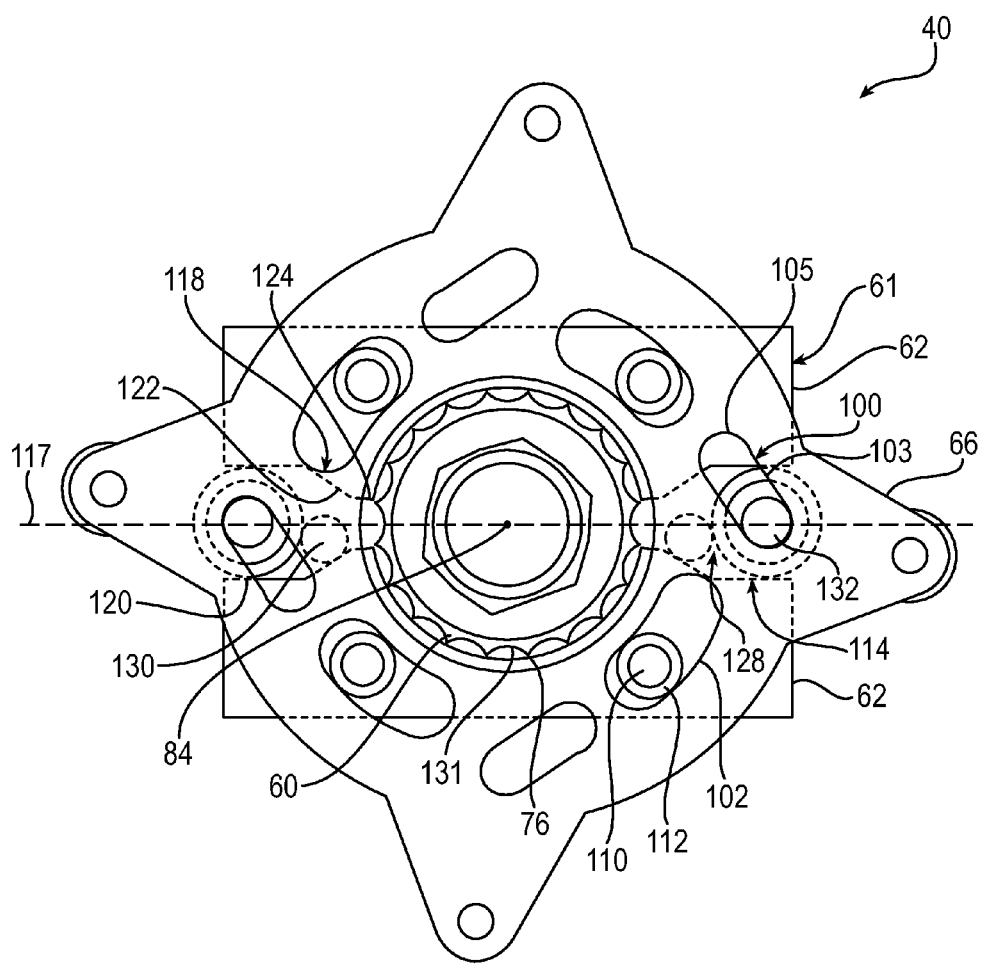
FIG. 9 is a partial front elevational view of the exemplary brake apparatus of FIG. 2 in an unlocked state.
Figure 10:
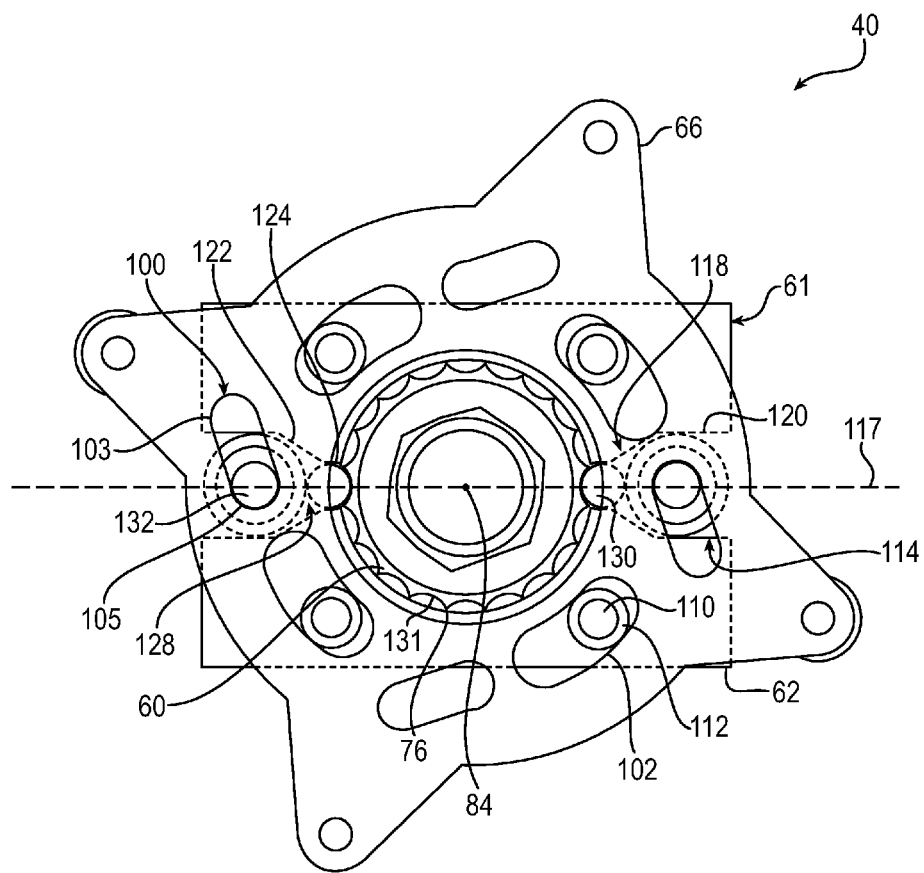
FIG. 10 is a partial front elevational view of the exemplary brake apparatus of FIG. 2 in a locked state.

Referring now to FIGS. 9 and 10, cooperative engagement of the actuator plates 66, lock assemblies 128, guide rail assembly 61, and brake gear 60, among other components of the brake apparatus 40, will be explained. During use of the mower 10, to restrict rotation of the wheels 20, for example when the mower 10 is parked and not in use, the operator may actuate a control thereby controlling the brake apparatus 40. In other embodiments, the brake apparatus 40 may be automatically activated and not require operator action.

In the present example, when the operator actuates the control, the actuator plates 66 generally are moved, from the first position shown in FIG. 9 to the second position shown in FIG. 10. As the actuator plates 66 rotate about the axis of the motor shaft 36, the actuator plates 66 are moved relative to and guided by the rotation members 112 disposed on the fasteners 110 attached to the motor 34. Additionally, rotation of the actuator plates 66 causes the cam rollers 132 engaged in the cam slots 100 to move from their first radially outward position (FIG. 9) to their second radially inward position (FIG. 10) within both the cam slots 100 and the guide slots 114, thereby effecting movement of the lock rollers 130.

The actuator plates 66 are rotatable between the unlocked state shown in FIG. 9 and the locked state shown in FIG. 10 via actuation or movement of the actuator member 68. The actuator member 68, or the actuator plates 66 with an actuator member 68 omitted, may be movable in some embodiments via a cable (not shown) or rigid linkage connected at one end to an operator or automatic control and at another end to the actuator plates 66 or actuator member 68. Alternatively, the actuator plates 66 may be actuated using any suitable linear or rotational motion mechanism that would provide a predetermined amount of travel and predetermined amount of force, such as an electro-mechanical mechanism, rigid mechanical mechanism (e.g., bar), hydraulic mechanism, pneumatic mechanism, etc. applied to rotate the actuator plates 66.

Referring to FIG. 9, the brake apparatus 40 is shown in an unlocked state with the cam roller 132 disposed such that the lock roller 130 is enabled to be disengaged from the brake gear 60. Particularly, the cam roller 132 is in its first radially outward position. In this state, the brake gear 60 is not restricted from rotating about the rotational axis 84, and thus the wheel 20 may continue to rotate.

To move the brake apparatus 40 into the locked state shown in FIG. 10, the actuator member 68 is moved to cause rotation of the actuator plates 66 along the rotation members 112 and about the rotational axis 84. Looking at FIGS. 9 and 10 on the pages, clockwise rotation of the actuator plates 66 causes each cam roller 132 to move radially inwardly, and particularly to move radially inwardly along the translation axis 117.

As the cam roller 132 is moved radially inwardly to its second radially inward position, the cam roller 132 effects engagement of the lock roller 130, such as direct engagement, such as by pushing the lock roller 130 along, and generally up, the inclined portion 122, and into the restraining portion 124. In the restraining portion 124, when a root 131 between crests of teeth 76 is aligned with the respective guide slot 114, the lock roller 130 will be received into the root 131, thus engaging and restricting rotation of the brake gear 60.

When the brake apparatus 40 is locked and the brake gear 60 is restricted from rotating, the locking portion 105 is aligned with the guide slot 114 such as to overlap the guide slot 114. In other words, the locking axis 106 is aligned transverse the translation axis 117, such as orthogonal to the translation axis 117, as shown in FIG. 10, and also in FIG. 8. The axes 106 and 117 further intersect. This arrangement provides a secure locking of the lock assembly 128 to restrict loading torque applied at the brake gear 60 from causing accidental movement of the brake apparatus 40 from a locked state to an unlocked state.

In the locked state, loading torque applied at the brake gear 60 applies a force to the cam roller 132 via the lock roller 130. The force applied to the cam roller 132 is generally applied along the translation axis 117 and into a side wall 140 (FIG. 8) of the locking portion 105 of the cam slot 100. As best shown in FIG. 8, the side wall 140 defines the locking portion 105 of the cam slot 100 and extends about and retains the cam roller 132. Thus, via the cam roller 132 being seated in the locking portion 105 when in the locked state, rather than in the camming portion 103, the cam roller 132 is restricted from moving along the cam slot 100 in response to loading torque applied to the brake gear 60 when the brake apparatus 40 is locked, in turn restricting or altogether preventing rotation of the actuator plates 66 out of the second position shown in FIG. 10.

To unlock the brake apparatus 40 and move the apparatus 40 from the locked state (FIG. 10) to the unlocked state (FIG. 9), the plates 66 are rotated, in an opposite direction. For example, looking at FIGS. 9 and 10 on the pages, counterclockwise rotation of the actuator plates 66 causes each cam roller 132 to move radially outwardly, and particularly to move radially outwardly along the translation axis 117.

When moved radially outwardly, the cam roller 132 effects disengagement of the lock roller 130 from the brake gear 60. Radial outward movement of the cam roller 132 moves the cam roller 132 away from the brake gear 60. The lock roller 130 is enabled to move out of the restraining portion 124 and to move down, such as to roll down, the inclined portion 122 and away from the brake gear 60 into a position displaced from the brake gear 60, and thus into the position shown in FIG. 9.

It will be appreciated that the actuation of the brake apparatus 40 may be spring applied and actuated to release, actuated to apply and spring released, actuated to apply and release, etc. A spring, such as a pre-compressed compression spring or an extension spring, may be coupled on or near the actuator member 68 or coupled on or near the actuator plates 66 that allows for extra compliance for the lock assemblies 128 to be aligned for locking engagement with teeth 76. For example, if a tooth 76 (crest) is aligned with the respective guide slot 114, the spring may allow for extra compliance of the actuator plates 66 until the brake gear 60 is further rotated and a root 131 is aligned with the respective guide slot 114. One or more springs may be included and the one or more springs may be any suitable spring, such as a wave spring, coil spring, leaf spring, solid spring, etc.

In summary, a brake apparatus 40 is provided including a brake gear 60 operatively rotatable with a rotatable member, such as the output shaft 36, and a lock assembly 128 for meshing with the brake gear 60 to restrict rotation of the brake gear 60. The lock assembly 128 includes rollers 130 and 132 providing for reduced surface contact and consequently reduced frictional forces during brake actuation. A guide rail assembly 61 guides the lock assembly 128 between an unlocked arrangement and a locked arrangement. An actuator plate 66 is selectively rotatable about the brake gear 60 and jointly engages the lock assembly 128 along with the guide rail assembly 61 to effect meshing and unmeshing of the lock assembly 128 with the brake gear 60.

The brake apparatus 40 provides an apparatus for restricting rotation of a shaft that has a lower actuation force and reduced friction as compared to conventional braking apparatuses. Components experiencing heavy loads, such as the cam rollers 132 and lock rollers 130 of the lock assemblies 128, are generally exposed to rolling friction instead of sliding friction. The brake apparatus 40 requires generally equal magnitude engagement and disengagement forces. The brake apparatus 40 may be operated using electric actuation due to the low actuation forces required. Components of the apparatus 40 may be reversible for use with both clockwise and counterclockwise locking directions, such as with both left and right aligned transmissions.

Figure 11:
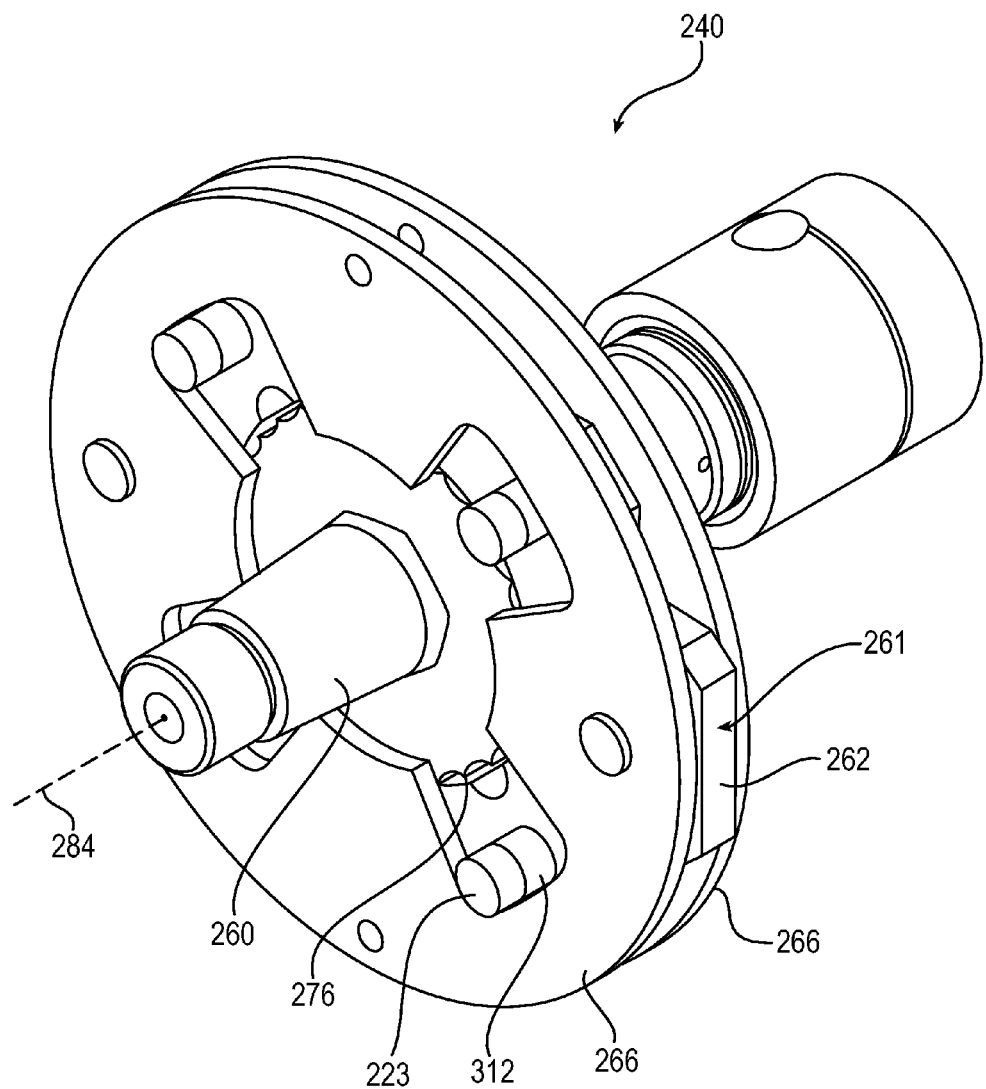
FIG. 11 is a perspective view of another exemplary brake apparatus according to the invention.
Figure 12:
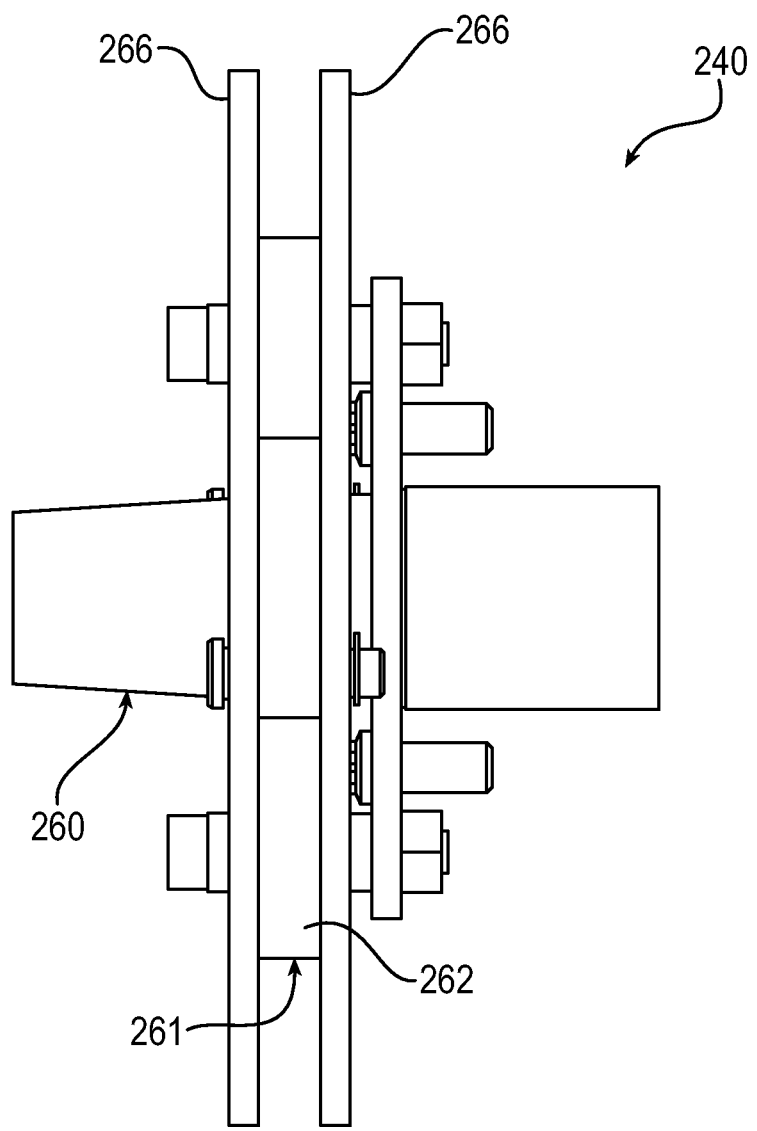
FIG. 12 is a partial side elevational view of the exemplary brake apparatus of FIG. 11.
Figure 13:
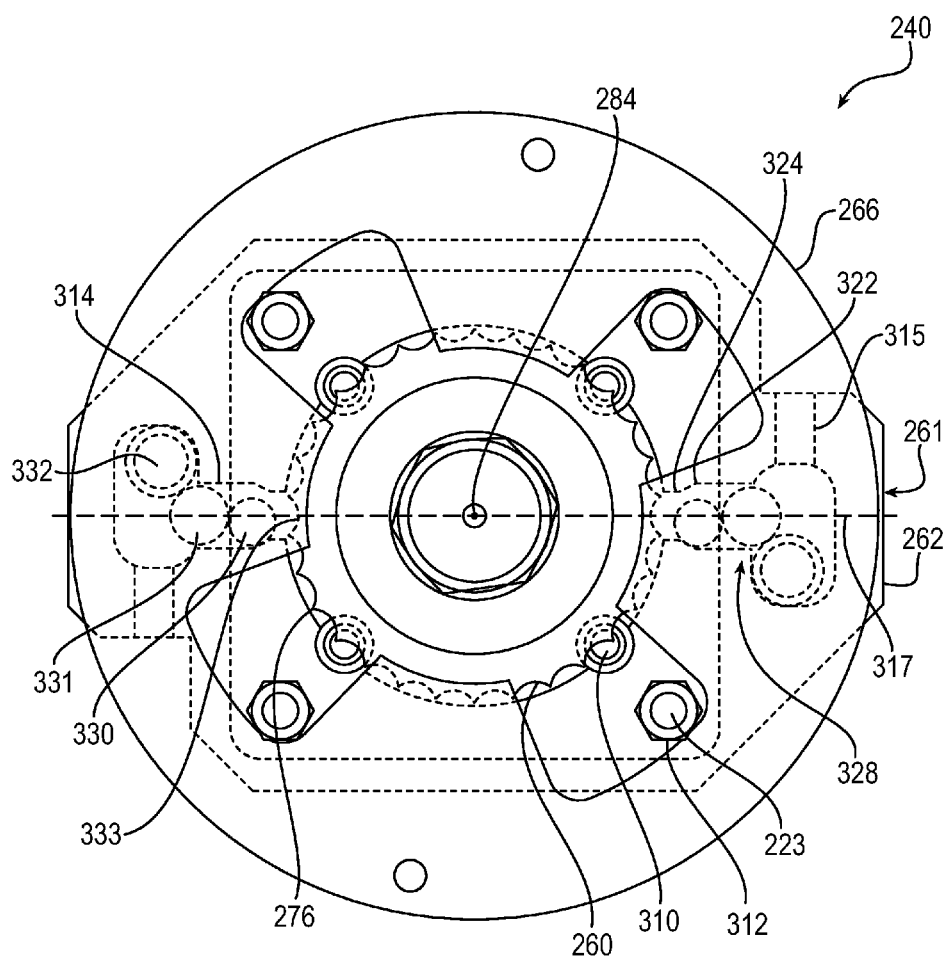
FIG. 13 is a partial front elevational view of the exemplary brake apparatus of FIG. 11 in an unlocked state.
Figure 14:
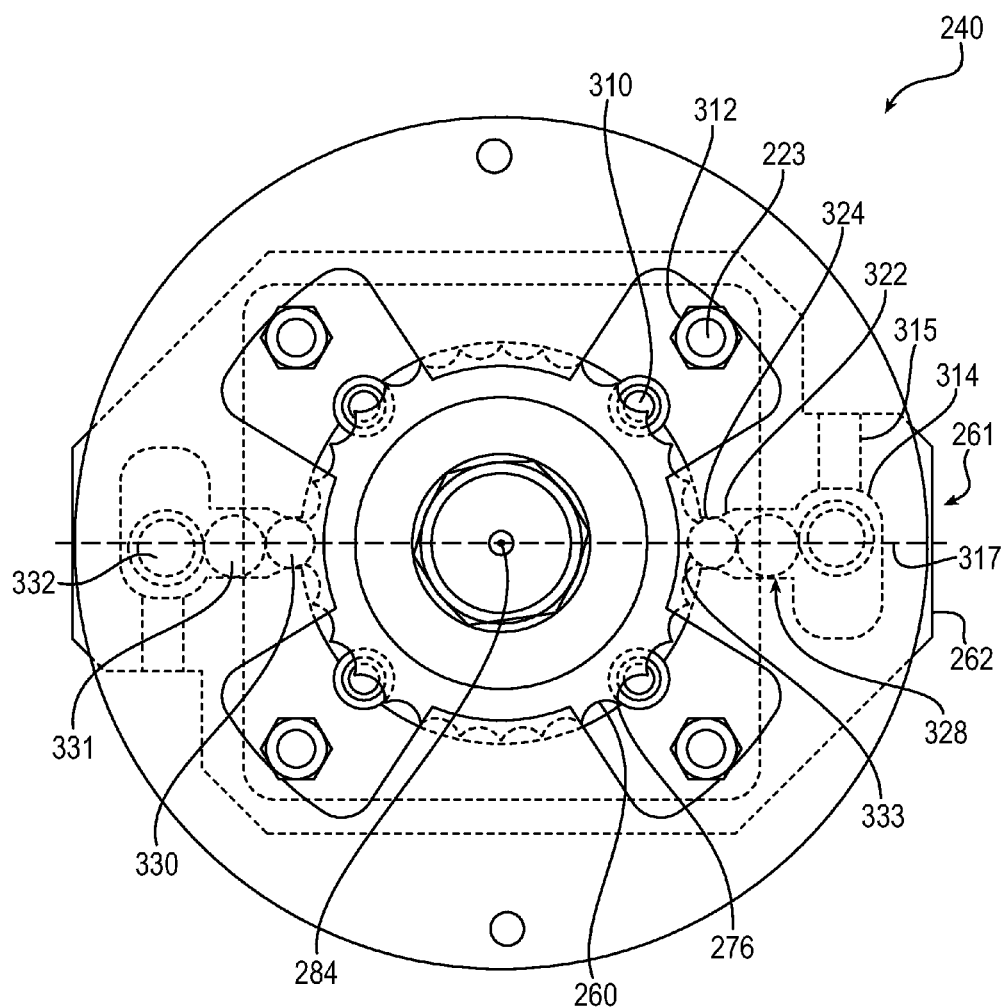
FIG. 14 is a partial front elevational view of the exemplary brake apparatus of FIG. 11 in a locked state.

Turning now to FIG. 11, and also to FIGS. 12-14, another exemplary embodiment of the brake apparatus in accordance with the invention is shown at 240. The brake apparatus 240 is substantially the same as the above-referenced brake apparatus 40, and consequently the same reference numerals but indexed by 200 are used to denote structures of the brake apparatus 240 corresponding to similar structures in the brake apparatus 40. In addition, the foregoing description of the brake apparatus 40 is equally applicable to the brake apparatus 240 except as noted below. Moreover, it will be appreciated upon reading and understanding the specification that aspects of the brake apparatuses 40 and 240 may be substituted for one another or used in conjunction with one another where suitable.

The brake apparatus 240 may be used with the transmission 30 of the mower 10 of FIG. 1, or with any equipment requiring restriction of rotation of a component. The brake apparatus 240 includes actuator plates 266, a guide rail 262, a brake gear 260, and lock assemblies 328. The guide rail 262 is mountable to a portion of the motor 34, such as the shaft support 39, though fasteners 310 provided for mounting the brake apparatus 240 are not provided for supporting rotation of the actuator plates 266 relative to the guide rail 262. Rather, fasteners 223 are provided having rotation members 312, such as sleeve bearings, received on the fasteners 223 for supporting rotation of the actuator plates 266. In other embodiments, the fasteners 223 may be omitted, and the actuator plates 266 may be rotatably supported on the fasteners 310. In some embodiments the rotation members 312 may support rotation but may themselves be fixedly coupled to the fasteners 223 and thus may not rotate about the fasteners 223 in such case.

The guide rail 262 includes guide slots 314, and preferably oppositely disposed guide slots 314. Each guide slot 314 is configured, such as being shaped, to guide a lock assembly 328 to effect locking of the brake apparatus 240. The guide slot 314 is generally L-shaped and is integral with an entry slot 315 allowing for engagement, such as insertion, of components of the lock assembly 328 into the guide slot 314.

Each oppositely disposed lock assembly 328 includes a cam roller 332, a lock roller 330, and an intermediary roller 331, each of which is at least partially retained in the respective guide slot 314. Each of these rollers is generally rounded such as to provide reduced friction during actuation of the brake apparatus 240. The rounded surfaces of the rollers allow the rollers to engage one another such that the engagement between adjacent rollers, and between the rollers and the guide slot 314, is a line-to-line engagement.

Each cam roller 332 is at least partially fixedly coupled to the actuator plates 266, such that it rotates with the actuator plates 266 about the rotational axis 284. Accordingly, the cam rollers 332 may include a fastener portion and a bearing portion, where the fastener portion is coupled to the actuator plates 266 and the bearing portion is received on the fastener portion. The bearing portion directly engages the respective intermediary roller 331.

The intermediary roller 331 is disposed between the lock roller 330 and the cam roller 332 in the respective guide slot 314, and thus the intermediary roller 331 is disposed radially outward of the lock roller 330 and radially inward of the cam roller 332, relative to the rotational axis 284. The intermediary roller 331 is shown as a pin, but may be a tube or include a roller bearing, pin bearing, sleeve bearing, bushing, etc. in other embodiments.

To effect movement of the lock roller 330 to engage the brake gear 260, the lock roller 330 is directly engaged by the intermediary roller 331, rather than directly engaged by the cam roller 332 as in the embodiment of the brake apparatus 40 where the cam roller 132 directly engages the lock roller 130. Thus, in the embodiment of the brake apparatus 240, the cam roller 332 directly engages the intermediary roller 331.

Turning now specifically to FIGS. 13 and 14, to move the brake apparatus 240 into the locked state shown in FIG. 14, an actuator, such as attached to the actuator plates 266, is moved to cause rotation of the actuator plates 266 about the rotational axis 284 and along the rotation members 312. Looking at FIGS. 13 and 14 on the pages, counterclockwise rotation of the actuator plates 266 causes each cam roller 332 to rotate counterclockwise with the actuator plates 266 about the rotational axis 284. The cam roller 332 then moves the intermediary roller 331 causing the intermediary roller 331 to move radially inwardly, and particularly to move radially inwardly along the translation axis 317.

As the intermediary roller 331 is moved radially inwardly, the intermediary roller 331 effects radial inward movement of the lock roller 330, such as by pushing the lock roller 330 along, and generally up, the inclined portion 322, and into the restraining portion 324. When a root 333 between crests of teeth 276 is aligned with the respective guide slot 314, the lock roller 330 will be received into the root 333, thus engaging and restricting rotation of the brake gear 260. When the brake apparatus 240 is locked and the brake gear 260 is restricted from rotating, the arrangement of the lock assembly 328 provides secure locking to restrict or altogether prevent loading torque applied at the brake gear 260 from accidently moving the brake apparatus 240 from a locked state to an unlocked state.

In the locked state shown in FIG. 14, loading torque applied at the brake gear 260 applies a force to the cam roller 332 via the lock roller 330 and intermediary roller 331. The force applied to the cam roller 332 is generally applied along the translation axis 317 radially outwardly. The location of the cam roller 332 in guide slot 314 in the locked state restricts the loading torque from causing reverse rotation of the cam roller 332 and actuator plates 266 about the rotational axis 284 such as to move the brake apparatus 240 into the unlocked state shown in FIG. 13.

To unlock the brake apparatus 240 and move the apparatus 240 from the locked state (FIG. 14) to the unlocked state (FIG. 13), the actuator plates 266 are rotated, in an opposite direction. For example, looking at FIGS. 13 and 14 on the pages, clockwise rotation of the actuator plates 266 causes each cam roller 332 to move clockwise about the rotational axis 284, allowing the intermediary roller 331 and lock roller 330 to move radially outwardly.

When moved radially outwardly, the intermediary roller 331 effects disengagement of the lock roller 330 from the brake gear 60. The lock roller 330 is enabled to move out of the restraining portion 324 and to move down, such as to roll down, the inclined portion 322 and away from the brake gear 260 into a position displaced from the brake gear 260, and thus into the position shown in FIG. 13.

The arrangement of the lock assembly 328 having three interengaging rounded components enables low friction actuation of the brake apparatus 240. It will be appreciated that additional rollers or rounded components may be included in the lock assembly 328. Similar to the brake apparatus 40, components of the brake apparatus 240 experiencing heavy loads, such as the cam rollers 332, intermediary rollers 331 and lock rollers 330 of the lock assemblies 328, are generally exposed to rolling friction instead of sliding friction. The brake apparatus 240 requires generally equal magnitude engagement and disengagement forces and may have a lower actuation force than the brake apparatus 40. The brake apparatus 240 may be operated using electric actuation due to the low actuation forces required. Additionally, components of the apparatus 240 may be reversible for use with both clockwise and counterclockwise locking directions, such as with both left and right aligned transmissions.

Turning now to FIGS. 15-18, another exemplary embodiment of a brake apparatus according to the invention is shown at 440. The brake apparatus 440 is similar to the above-referenced brake apparatus 40, and consequently many of the same reference numerals but indexed by 400 are used to denote structures of the brake apparatus 440 corresponding to similar structures in the brake apparatus 40. In addition, the foregoing description of the brake apparatus 40 is equally applicable to the brake apparatus 440 except as noted below. Moreover, it will be appreciated upon reading and understanding the specification that aspects of the brake apparatuses 40 and 440 may be substituted for one another or used in conjunction with one another where suitable.

The brake apparatus 440 may be used with a motive device of the mower 10 of FIG. 1 such as the transmission 30, or with any equipment requiring restriction of rotation of a component. The brake apparatus 440 includes actuator plates 466 having flange portions 486 and through holes 488, a guide rail assembly 461 having opposed guide rails 462, lock assemblies 528, and a brake gear 460 having a rotational axis 484, a hub portion 472 and teeth 476. The guide rail assembly 461 is mountable to a portion of the motor 34, such as the shaft support 39.

With respect to the guide rails 462 of the guide rail assembly 461, the guide slots 514 are defined by opposed parallel surfaces 518 and 520 of the guide rails 462. As depicted, the opposed parallel surfaces 518 and 520 are transposed along the rotation axis 484 between the actuator plates 466. The opposed parallel surfaces are configured for guiding at least one engagement member of a lock assembly 528, such as an illustrated jaw member 522, for slideable movement between the opposed parallel surfaces 518 and 520.

The guide rail assembly receives the opposed jaw members 522 in the guide slots 514. The two jaw members 522 are disposed opposite one another about the rotational axis 484 to provide for balanced locking of the brake gear 460. In other embodiments, only one jaw member 522 may be used, though such alternative arrangement may provide a less-balanced resistance of unlocking forces as that provided by two jaw members 522 each oppositely disposed in a guide slot 514.

Referring now to one of the jaw members 522, but applicable to both jaw members 522, a radially inner surface of the jaw member 522 includes teeth 524 for engaging the teeth 476 of the brake gear 460. Particularly, the teeth 524 are shaped to engage roots 525 between adjacent crests, e.g., the teeth 476, of the brake gear 460. Accordingly, the teeth 524 are configured, such as being shaped, to engage the brake gear 460, to restrict rotational movement of the brake gear 460 about the rotation axis 484.

Each jaw member 522 is configured, such as having opposed parallel jaw surfaces 523, for engaging the opposed parallel surfaces 518 and 520 for slideable movement along the translation axis 517. In the depicted embodiment, the jaw members 522 have a relatively thin thickness dimension along the rotational axis 484. This thickness provides for reduced surface contact of the jaw surfaces 523 with the opposed parallel surfaces 518 and 520. The reduced surface contact area generally results in reduced frictional forces during brake actuation, which may improve operation for the user, particularly when the vehicle is parked on a grade.

Although being transposed between the actuator plates 466, the jaw members 522 are spaced, preferably, from the actuator plates 466 due to the arrangement of the rotation members 512. This further reduces frictional forces necessary to overcome to move the jaw members 522 to engage the brake gear 460 when the jaw members 522 are moved along the translation axis 517 between the opposed parallel surfaces 518 and 520 and between the opposed primary and secondary actuator plates 466.

Moreover, as shown, the guide slots 514 are aligned vertically to reduce friction forces between the guide rails 462 and the jaw members 522. The vertical alignment at least partially allows movement of each jaw member 522 in at least one moving direction (engaging direction or disengaging direction) to be aided by gravitational forces acting on the jaw member 522. In other embodiments, the guide slots 514 may be aligned horizontally, such as where increased friction due to gravitational forces is acceptable.

The jaw members 522 are moved to engage and disengage the brake gear 460 via engagement with the actuator plates 466. Each jaw member 522 receives an engagement follower, such as a cam follower 530, which is movable by the actuator plates 66 to effect movement of the respective jaw member 522.

Generally, during rotation of the actuator plates 466 about the rotational axis 484, the cam followers 530 are jointly engaged by the actuator plates 466 and the guide rails 462 to move the cam followers 530, and thus the jaw members 522, inwardly and outwardly toward the rotational axis 484. Particularly, the cam followers 530 and jaw members 522 are translated along the translation axis 517 and the jaw members 522 are guided by the opposed parallel surfaces 518 and 520 during the translation. In this way, rotation of the actuator plates 466 is converted into linear movement of the jaw members 522 along the translation axis 517.

The illustrated cam followers 530 are provided in the form of a roller 531 received in the jaw members 522 with a rotation member 532 disposed about each roller 531. The rollers 531 may be pins, rods, cylinders, etc. The rotation members 532 may be any suitable bushing or bearing, such as a needle bearing, roller bearing, sleeve bearing, etc. In some embodiments the rotation members 532 may be omitted where suitable.

The cam followers 530 are each received in respective cam slots 500 of the actuator plates 466. The cam followers 530 are bounded by and slideably guided in the generally linear cam slots 500, and preferably in the linear camming portions 503 of the actuator plates 466. As shown, the cam followers 530 extend between each of the primary and secondary actuator plates 466. The cam followers 530 may also be engaged in the locking portion 505 of the cam slots 500 to maintain engagement of the teeth 524 with the brake gear 460, to be further explained.

A portion of the cam followers 530, such as the rollers 531, are preferably coupled to end caps or snap rings at opposite axial ends of the cam followers 530, such as at opposite axial ends of the rollers 531. One of the end caps or snap rings is thus disposed adjacent each of the actuator plates 466. In this way, the actuator plates 466 are axially maintained along the cam followers 530 relative to one another. Though the actuator plates 466 may axially translate minimally relative to one another along the cam followers 530 and along the fasteners 510.

Figure 15:
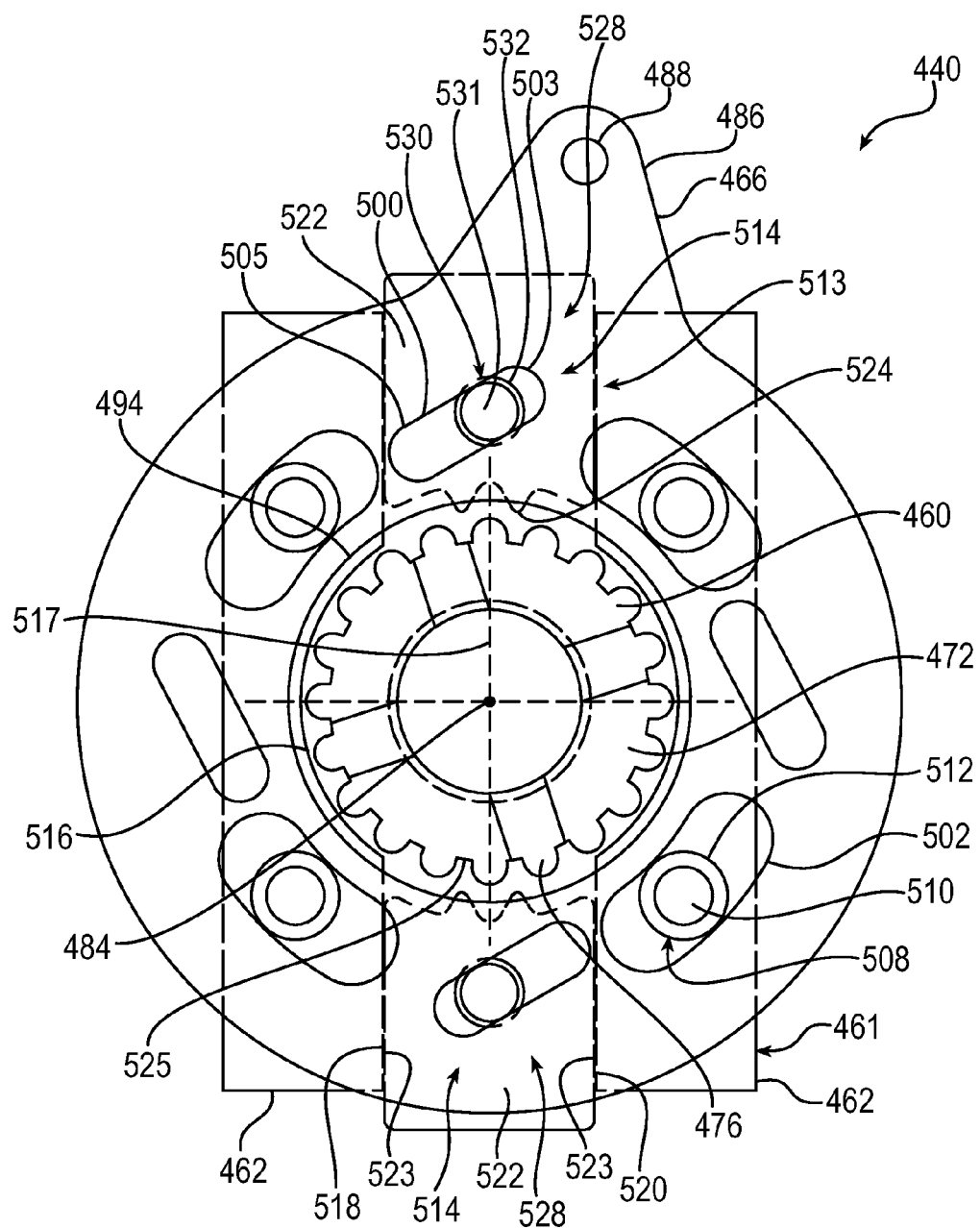
FIG. 15 is a partial front elevational view of yet another exemplary brake apparatus according to the invention, showing the brake apparatus in an unlocked state.
Figure 16:
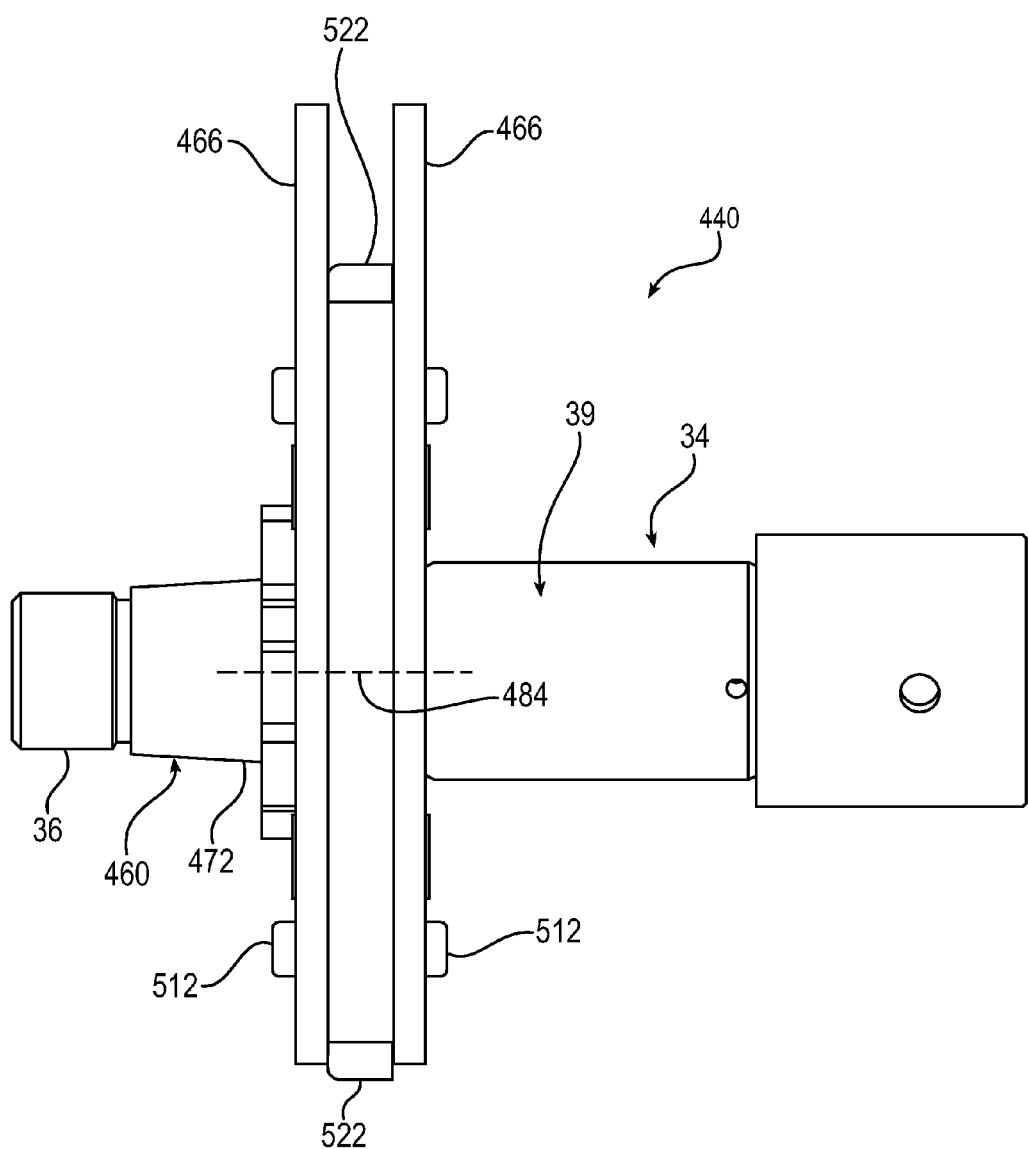
FIG. 16 is a partial side elevational view of the exemplary brake apparatus of FIG. 15.
Figure 18:
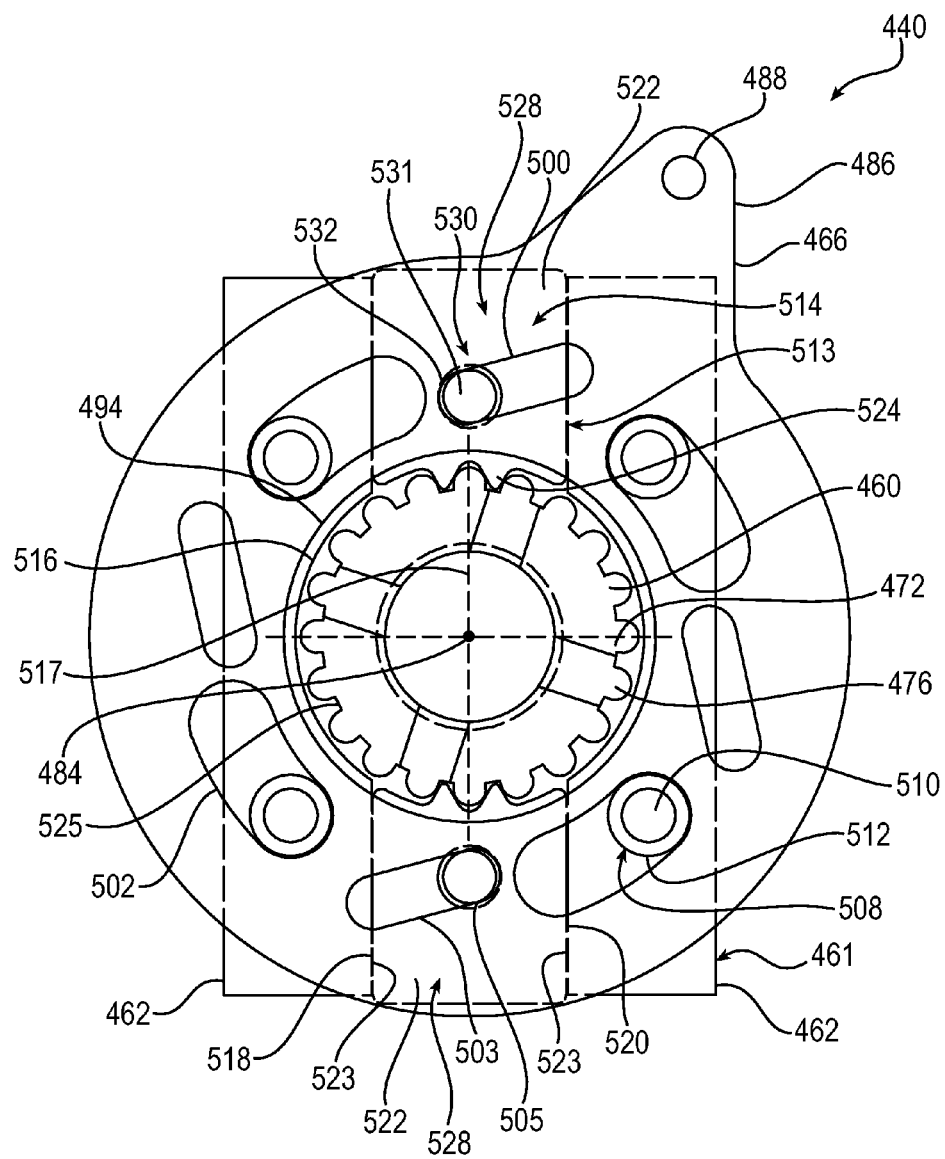
FIG. 18 is a partial front elevational view of the exemplary brake apparatus of FIG. 15 in a locked state.

Referring now in particular to FIGS. 15 and 18, cooperative engagement of the actuator plates 66, jaw members 522, guide rail assembly 461, and brake gear 460 will be explained. During use of a respective vehicle, such as the mower 10 (FIG. 1), to restrict rotation of the wheels 20 (FIG. 1), such as when the mower 10 is parked and not in use, the operator may actuate a control thereby controlling the brake apparatus 440. In other embodiments, the brake apparatus 440 may be automatically activated and may not require operator action.

In the present example, when the operator actuates the control, the actuator plates 466 generally are moved, from the first position shown in FIG. 15 to the second position shown in FIG. 18. As the actuator plates 466 rotate about the axis of the motor shaft 36, the actuator plates 466 are moved relative to and guided by the rotation members 512 disposed on the fasteners 510 attached to the shaft support 39. Additionally, rotation of the actuator plates 466 causes the cam followers 530 engaged in the cam slots 500 to move from their first radially outward position (FIG. 15) to their second radially inward position (FIG. 18) within both the cam slots 500 and the guide slots 514, thereby effecting movement of the jaw members 522.

The actuator plates 466 are rotatable between the unlocked state shown in FIG. 15 and the locked state shown in FIG. 18 via actuation or movement of an actuator member, such as the actuator member 68 shown in FIG. 4. The actuator member 68, or the actuator plates 466 with an actuator member 68 omitted, may be movable in some embodiments via a cable (not shown) or rigid linkage connected at one end to an operator or automatic control and at another end to the actuator plates 466 or actuator member 68. Alternatively, the actuator plates 466 may be actuated using any suitable linear or rotational motion mechanism that would provide a predetermined amount of travel and predetermined amount of force, such as an electro-mechanical mechanism, rigid mechanical mechanism (e.g., bar), hydraulic mechanism, pneumatic mechanism, etc. applied to rotate the actuator plates 466.

Referring to FIG. 15, the brake apparatus 440 is shown in an unlocked state with the cam followers 530 disposed such that the jaw members 522 are disengaged from the brake gear 460. Particularly, the cam followers 530 and jaw members 522 are in the first radially outward position. In this state, the brake gear 460 is not restricted from rotating about the rotational axis 484, and thus the wheel 20 (FIG. 1) may continue to rotate.

To move the brake apparatus 440 into the locked state shown in FIG. 18, the actuator member 68 is moved to cause rotation of the actuator plates 466 along the rotation members 512 and about the rotational axis 484. Looking at FIGS. 15 and 18 on the pages, clockwise rotation of the actuator plates 466 causes each jaw member 522 to move radially inwardly, and particularly to move radially inwardly along the translation axis 517. As the cam followers 530 are moved radially inwardly to the second radially inward position, the movement of the cam followers 530 effects engagement of the jaw members 522 with the brake gear 460, thus restricting rotation of the brake gear 460.

When the brake apparatus 440 is locked and the brake gear 460 is restricted from rotating, the locking portions 505 of the cam slots 500 are aligned with the guide slots 514 such as to overlap the guide slots 514. In other words, the locking axes 506 are aligned transverse to the translation axis 517, such as orthogonal to the translation axis 517, as shown in FIG. 18, and also in FIG. 17. The axes 506 and 517 further intersect. This arrangement provides a secure locking of the jaw members 522 with the brake gear 460 to restrict loading torque applied at the brake gear 460 from causing accidental movement of the brake apparatus 440 from a locked state to an unlocked state.

Figure 17:
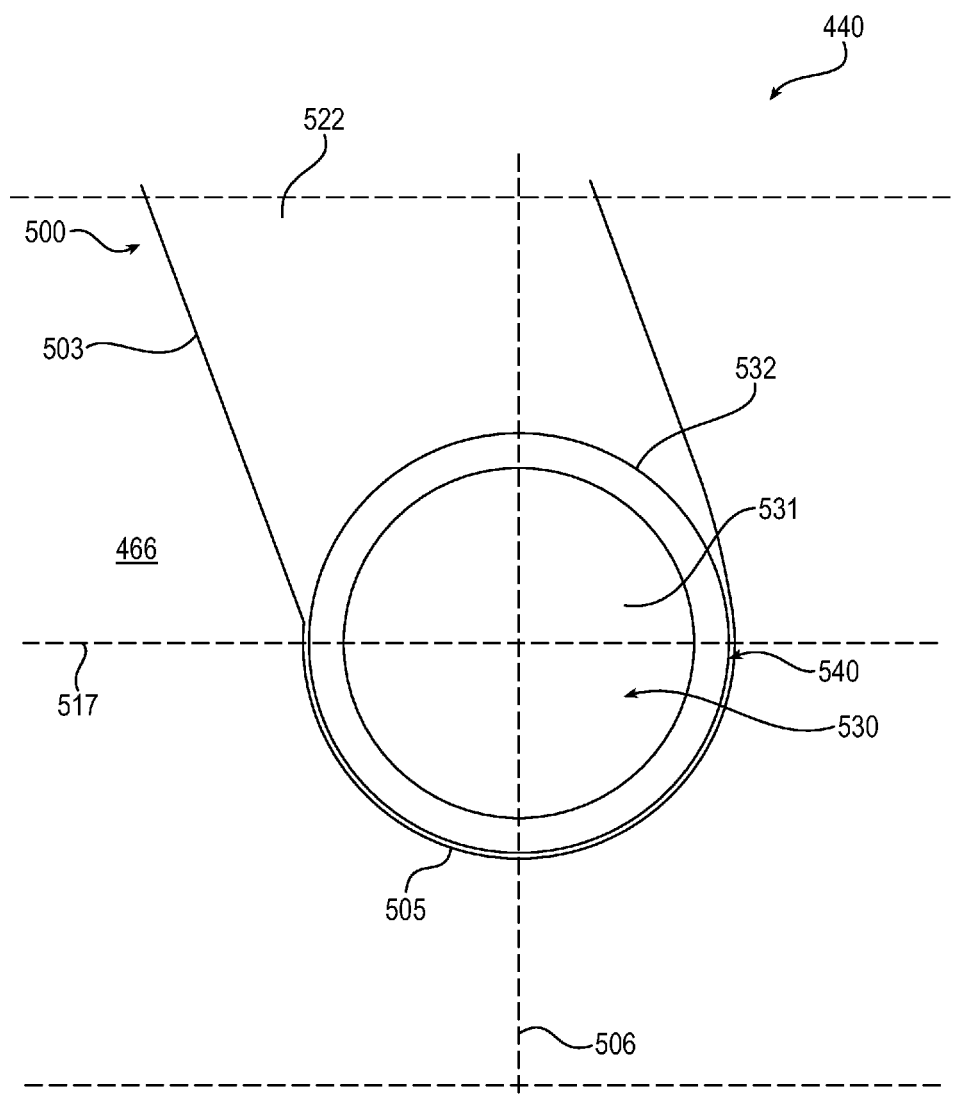
FIG. 17 is a partial magnified view of the exemplary brake apparatus of FIG. 16.

In the locked state, loading torque applied at the brake gear 460 applies a force to the cam followers 530 via the jaw members 522. The force applied to the cam followers 530 is generally applied along the translation axis 517 and into a side wall 540 (FIG. 17) of the locking portions 505 of the cam slots 500. As best shown in FIG. 17, the side wall 540 defines the locking portion 505 of the cam slot 500 and extends about and retains the cam follower 530.

Thus, via the cam follower 530 being seated in the locking portion 505 when in the locked state, rather than in the camming portion 503, the cam follower 530 is restricted from moving along the cam slot 500 in response to loading torque applied to the brake gear 460 when the brake apparatus 440 is locked, in turn restricting rotation of the actuator plates 466 out of the second position shown in FIG. 18.

To unlock the brake apparatus 440 and move the apparatus 440 from the locked state (FIG. 18) to the unlocked state (FIG. 15), the plates 466 are rotated in an opposite direction. For example, looking at FIGS. 15 and 18 on the pages, counterclockwise rotation of the actuator plates 466 causes each cam follower 530 and jaw member 522 to move radially outwardly, and particularly to move radially outwardly along the translation axis 517. When moved radially outwardly, the cam followers 530 effect disengagement of the jaw members 522 from the brake gear 460.

It will be appreciated that the actuation of the brake apparatus 440 may be spring applied and actuated to release, actuated to apply and spring released, actuated to apply and release, etc. A spring, such as a pre-compressed compression spring or an extension spring, may be coupled on or near the actuator member 68 (FIG. 4) or coupled on or near the actuator plates 466 that allows for extra compliance for the jaw members 522 to be aligned for locking engagement with teeth 476. For example, if a tooth 476 (crest) is aligned with the respective guide slot 514, the spring may allow for extra compliance of the actuator plates 466 until the brake gear 460 is further rotated and a root 525 is aligned with the respective guide slot 514. One or more springs may be included and the one or more springs may be any suitable spring, such as a wave spring, coil spring, leaf spring, solid spring, etc.

In summary with respect to FIGS. 15-18, a brake apparatus 440 is provided that includes a brake gear 460 operatively rotatable with a rotatable member, such as an output shaft 36, and a jaw member 522 having at least one tooth 524 for meshing with at least one tooth 476 of the brake gear 460 to restrict rotation of the brake gear 460. A guide rail assembly 461 includes opposed parallel surfaces 518 and 520 that guide the jaw member 522 for movement between the opposed parallel surfaces 518 and 520. The guide rail assembly 461 is fixable relative to a support of the rotatable member, such as a shaft support 39 for supporting the output shaft 36. An actuator plate 466 is selectively rotatable about the brake gear 460 relative to the guide rail assembly 461, where rotation of the actuator plate 466 effects movement of the jaw member 522 between an unlocked position spaced from the brake gear 460 and a locked position engaging the brake gear 460.

The brake apparatus 440 provides an apparatus for restricting, and possibly altogether preventing, rotation of a shaft, where the brake apparatus 440 has a lower actuation force and reduced friction as compared to conventional braking apparatuses. This is because components experiencing heavy loads, such as the cam followers 530 and jaw members 522, have minimized surface contacts with surrounding components. Moreover, the jaw members 522, as depicted, are aligned for vertical movement relative to gravity. The brake apparatus 440 requires generally equal magnitude engagement and disengagement forces. The brake apparatus 440 may be operated using electric actuation due to the low actuation forces required. Components of the apparatus 440 may be reversible for use with both clockwise and counterclockwise locking directions, such as with both left and right aligned transmissions.

In summary with respect to FIGS. 1-18, provided is a brake apparatus 40, 240 and 440 for a mowing machine 10, the brake apparatus 40, 240, and 440 including a brake gear 60, 260 and 460 operatively rotatable with a rotatable member, such as an output shaft 36, and a lock assembly 128, 328 and 528 for meshing with the brake gear 60, 260 and 460 to restrict rotation of the brake gear 60, 260 and 460. A guide rail assembly 61, 261 and 461 is fixable relative to a support of the rotatable member, such as a shaft support 39 for supporting the output shaft 36. The guide rail assembly 61, 261 and 461 guides a lock assembly 128, 328 and 528 movable between an unlocked arrangement and a locked arrangement. An actuator plate 66, 266 and 466 and the guide rail assembly 61, 261 and 461 jointly engage the lock assembly 128, 328 and 528 to effect meshing and unmeshing of at least one engagement member of the lock assembly 128, 328 and 528, such as a roller 130 and 330 or a jaw member 522, with the brake gear 60, 260 and 460. The actuator plate 66, 266 and 466 is selectively rotatable about the brake gear 60, 260 and 460 relative to the guide rail assembly 61, 261 and 461, where rotation of the actuator plate 66, 266 and 466 effects movement of the lock assembly 128, 328 and 528 between the unlocked and locked arrangements.

Each of the brake apparatuses 40, 240 and 440 may be an external, bolt-on device to replace friction brakes. Each brake apparatus may sustain large holding torques with low input forces due to the holding torque being independent of actuator input force. Each brake apparatus may use relatively small components to reduce cost, space requirements, and actuation effort for an operator. For example, the components may fit within an envelope six inches in diameter by two inches long, where a portion of one or both of the respective actuator plates 66, 266 and 466 and respective guide rails 62, 262 and 462 may extend outside of the envelope. The brake apparatuses 40, 240 and 440 may serve as, for example, a static brake that may perform dynamic stops, even for heavy vehicles at full speed. The brake apparatuses may disengage under load and can be configured for positive disengagement. The positive locking brake apparatuses may have a holding torque that is not proportional to input force to allow the brake to hold large loads with small input force.

The brake apparatuses 40, 240 and 440 are shown installed on the shaft support 39, although it will be appreciated that each of the brake apparatuses may be installed on an axle housing or other suitable structures in proximity to the output shaft 36. While shown mounted around the output shaft 36, the brake apparatuses 40, 240 and 440 may additionally or alternatively be mounted around a different brake shaft provided for braking, such as a brake shaft for a gear drive that is upstream of the output shaft 36, a brake shaft for a worm-gear type speed reducer, which is connected to or integral with an input shaft, a brake shaft for a straight shaft motor that is connected to or integral with the main output shaft (for example extending out the end of the motor opposite the main output shaft), etc.

As will be appreciated by those skilled in the art, the "gear" in the herein described brake assemblies need not be a transmission gear that meshes with another gear. Rather, the term gear is used to denote a rotatable member having a plurality of radially protruding teeth (i.e. protrusions) circumferentially spaced about a periphery of the rotatable member for engagement by the engagement member.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake apparatus for restricting rotation of a rotatable member, the brake apparatus comprising:
    a brake gear fixable on the rotatable member and the brake gear being rotatable with the rotatable member about an axis of rotation of the brake gear;
    at least one engagement member for meshing with the brake gear to restrict rotation of the brake gear;
    a guide rail assembly configured to guide the at least one engagement member between an unlocked position spaced from the brake gear and a locked position engaging the brake gear, the guide rail assembly being fixed against movement relative to the brake gear;
    an actuator plate selectively rotatable about the axis of rotation of the brake gear; and
    a cam follower movable by the actuator plate to effect movement of the at least one engagement member, wherein rotation of the actuator plate moves the cam follower in a first direction relative to the axis of rotation to effect engagement of the at least one engagement member with the brake gear and in a second direction opposite the first direction to enable disengagement of the at least one engagement member from the brake gear.

2. The brake apparatus of claim 1, wherein the guide rail assembly includes a guide slot, the at least one engagement member and the cam follower being cooperatively slideable in the guide slot.

3. The brake apparatus of claim 1, wherein the brake gear has a plurality of radially outwardly protruding gear teeth circumferentially spaced around the axis of rotation of the brake gear, and wherein the at least one engagement member is shaped to engage a root between adjacent crests of the gear teeth.

4. The brake apparatus of claim 1, in combination with a motive device having the rotatable member.

5. The brake apparatus of claim 1, wherein the actuator plate includes a cam slot in which the cam follower is slidably coupled.

6. A brake apparatus for restricting rotation of a rotatable member, the brake apparatus comprising:
    a brake gear fixable on the rotatable member and the brake gear being rotatable with the rotatable member about an axis of rotation of the brake gear;
    at least one engagement member for meshing with the brake gear to restrict rotation of the brake gear;
    a guide rail assembly configured to guide the at least one engagement member between an unlocked position spaced from the brake gear and a locked position engaging the brake gear; and
    an actuator plate selectively rotatable about the axis of rotation of the brake gear; and
    a cam follower movable by the actuator plate to effect movement of the at least one engagement member, wherein rotation of the actuator plate moves the cam follower in a first direction relative to the axis of rotation to effect engagement of the at least one engagement member with the brake gear and in a second direction opposite the first direction to enable disengagement of the at least one engagement member from the brake gear,
    wherein the guide rail assembly includes a guide slot that guides the cam follower radially inwardly and outwardly relative to the axis of rotation along a translation axis of the guide slot, wherein the translation axis is set orthogonal to the axis of rotation of the brake gear.

7. The brake apparatus of claim 5, wherein the cam slot has a locking portion that engages the cam follower when the cam follower is moved fully inwardly towards the axis of rotation along a translation axis orthogonal to the axis of rotation, the locking portion of the cam slot extending longitudinally along a plane of the actuator plate along a locking axis set orthogonal to the translation axis when the cam follower is moved fully inwardly towards the axis of rotation, thereby restricting unintentional rotation of the actuator plate.

8. The brake apparatus of claim 1, wherein the actuator plate is rotatably coupled to the guide rail assembly.

9. The brake apparatus of claim 2, wherein the at least one engagement member is a lock roller, and the guide slot includes a radially inward portion having an inclined surface along which inward movement of the lock roller is effected via the cam follower.

10. The brake apparatus of claim 9, wherein the cam follower is movable in the guide slot to effect movement of the lock roller via direct engagement with the lock roller, and wherein the lock roller and cam follower have rounded surfaces for engaging one another such that the engagement is a line-to-line engagement.

11. The brake apparatus of claim 9, further including an intermediary roller disposed between the lock roller and the cam roller, wherein the cam roller is movable to effect movement of the lock roller via direct engagement with the intermediary roller, the guide slot retaining and guiding interengagement of the cam roller, lock roller, and intermediary roller.

12. The brake apparatus of claim 11, wherein the lock roller, intermediary roller and cam roller each have rounded surfaces for engaging one another such that the engagement between adjacent rollers is a line-to-line engagement.

13. The brake apparatus of claim 2, wherein the at least one engagement member is a jaw member having at least one tooth for meshing with at least one tooth of the brake gear to restrict rotation of the brake gear, and wherein the guide rail assembly has opposed parallel surfaces configured for guiding the jaw member for slideable movement between the opposed parallel surfaces.

14. The brake apparatus of claim 13, wherein the guide slot is aligned vertically.

15. A brake apparatus for restricting rotation of a rotatable member, the brake apparatus comprising:
a brake gear for operatively coupling with the rotatable member;
an engagement member for meshing with the brake gear to restrict rotation of the brake gear about an axis of rotation of the brake gear;
a guide rail assembly having a guide slot retaining the engagement member, the engagement member slideable within the guide slot between a first position engaging the brake gear and a second position displaced from the brake gear;
a cam follower for effecting movement of the engagement member to the first position, wherein the cam follower and the engagement member are cooperatively slideable within the guide slot; and
an actuator plate selectively controlled to rotate about the axis of rotation of the brake gear and radially supported relative to the rotatable member, wherein the cam follower is coupled within a plate slot of the actuator plate, and wherein rotation of the actuator plate moves the cam follower in the guide slot.

16. The brake apparatus of claim 15, wherein the guide rail assembly is fixable relative to a rotatable member support that is supporting the rotatable member for rotational movement.

17. The brake apparatus of claim 15, wherein the plate slot is a cam slot extending along the actuator plate, wherein rotation of the actuator plate cams the cam follower in the cam slot, and wherein movement of the cam follower within the guide slot is effected as linear translation of the cam follower along the guide slot.

18. The brake apparatus of claim 15, wherein the engagement member is a lock roller being moved via line-to-line engagement with the cam follower or an intermediary roller disposed between the cam follower and the lock roller.

19. The brake apparatus of claim 15, wherein the engagement member is a jaw member having at least one tooth for meshing with at least one tooth of the brake gear to restrict rotation of the brake gear, and wherein the guide rail assembly has opposed parallel surfaces configured for guiding the jaw member for slideable movement between the opposed parallel surfaces.

* * * * *